No. 884,639.

T. CARNEY.
CASH REGISTER.
APPLICATION FILED APR. 17, 1899.

PATENTED APR. 14, 1908.

14 SHEETS—SHEET 4.

No. 884,639. PATENTED APR. 14, 1908.
T. CARNEY.
CASH REGISTER.
APPLICATION FILED APR. 17, 1899.

14 SHEETS—SHEET 5.

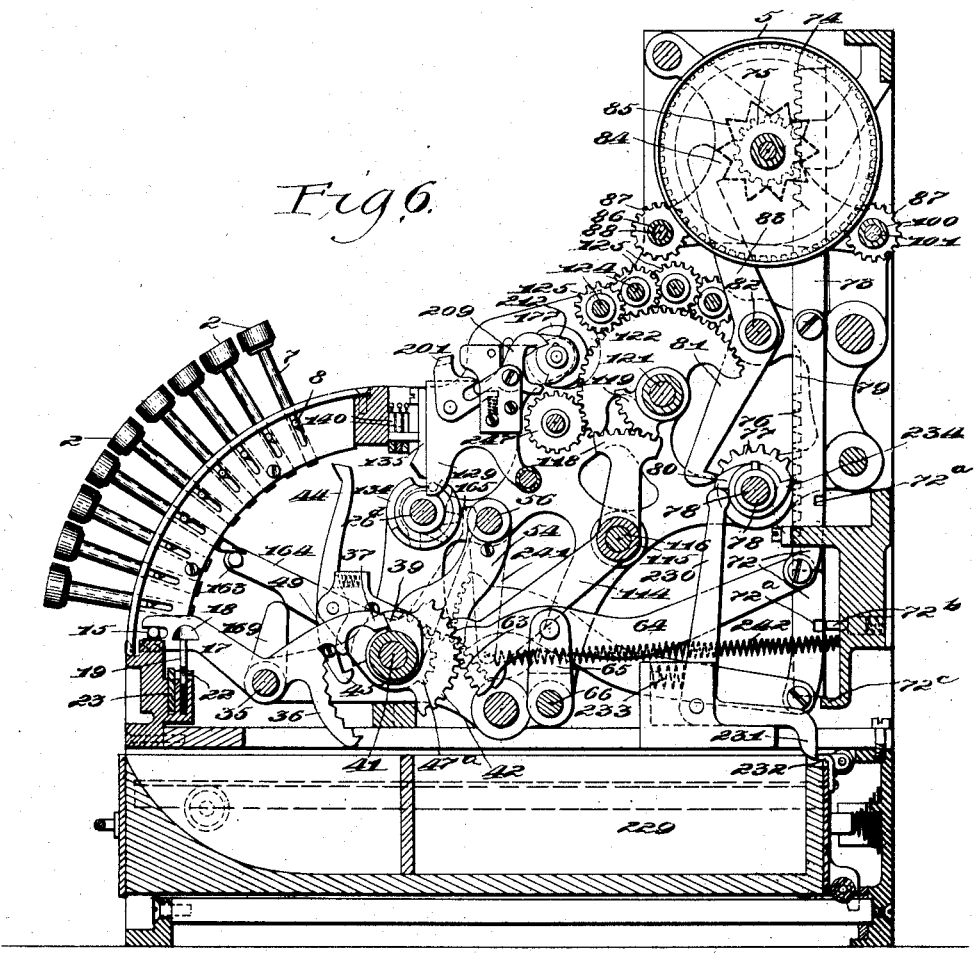

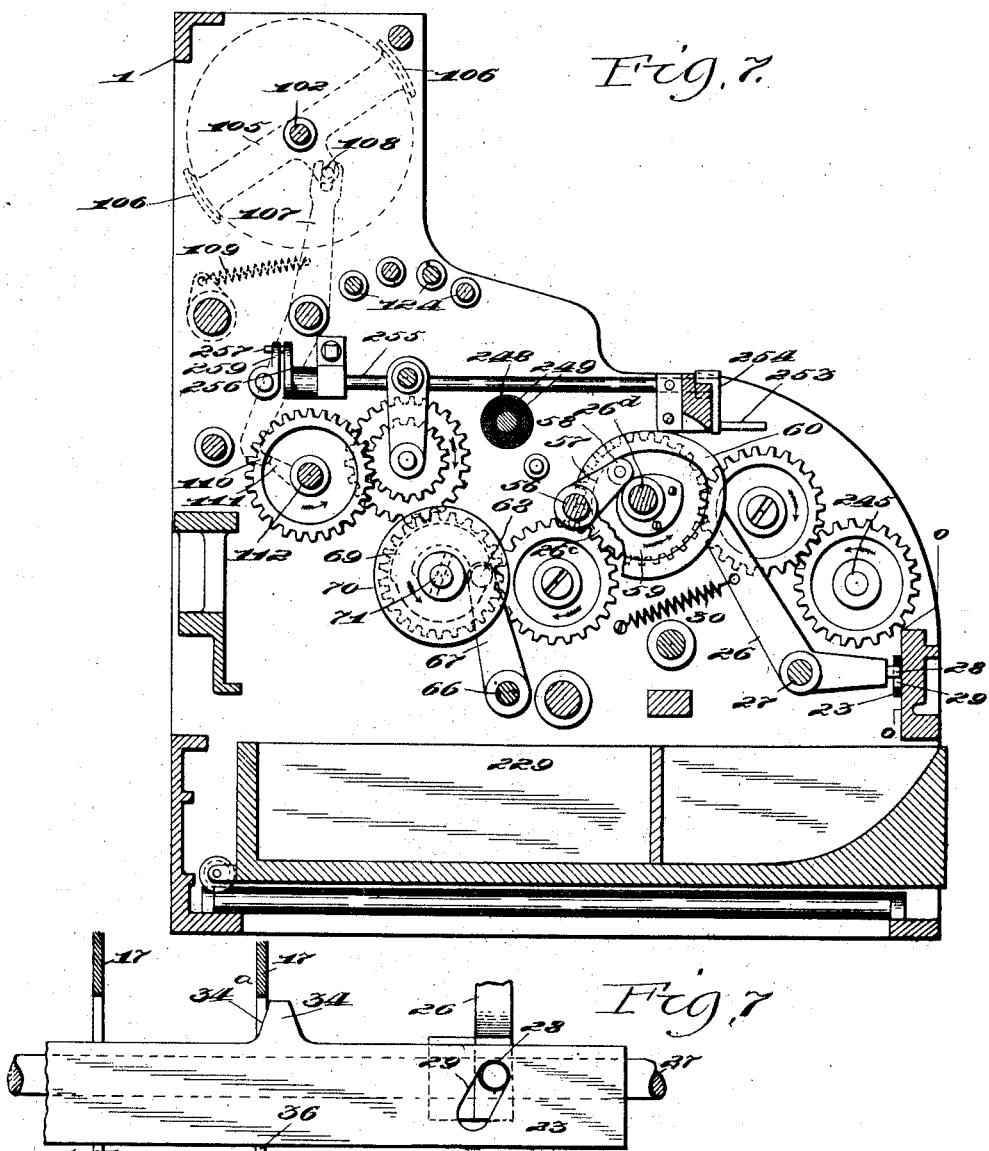

No. 884,639. PATENTED APR. 14, 1908.
T. CARNEY.
CASH REGISTER.
APPLICATION FILED APR. 17, 1899.
14 SHEETS—SHEET 8.
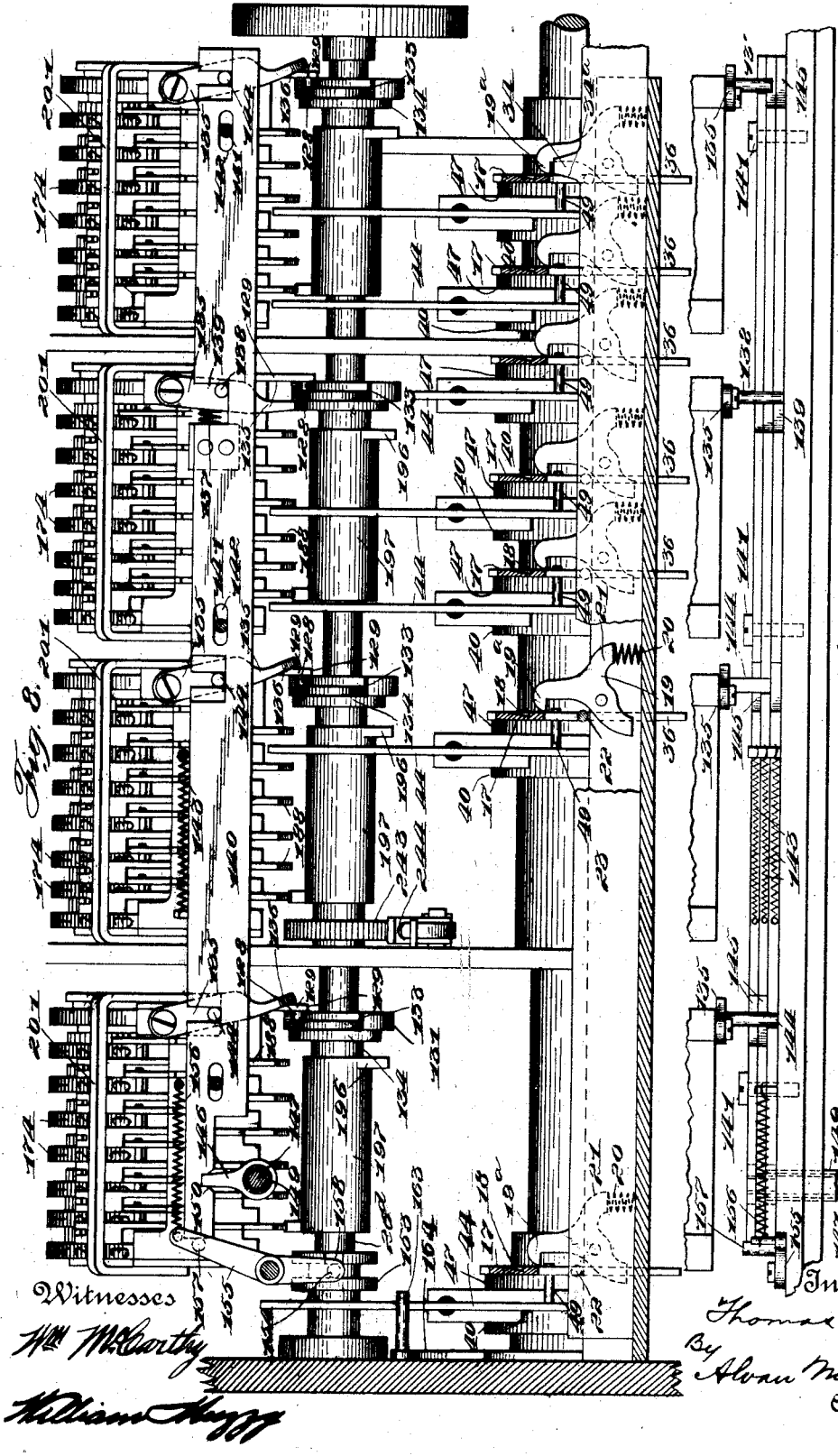

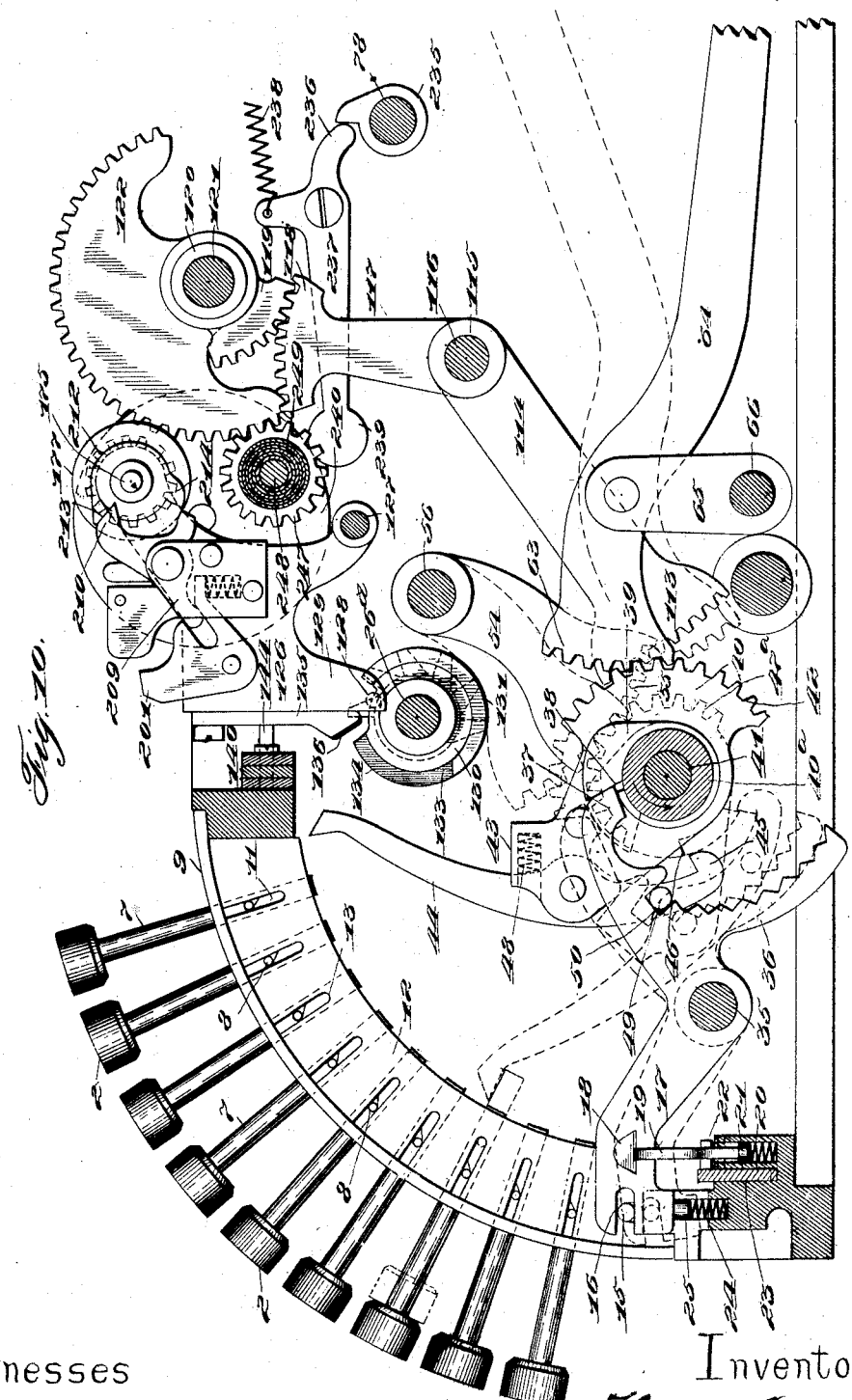

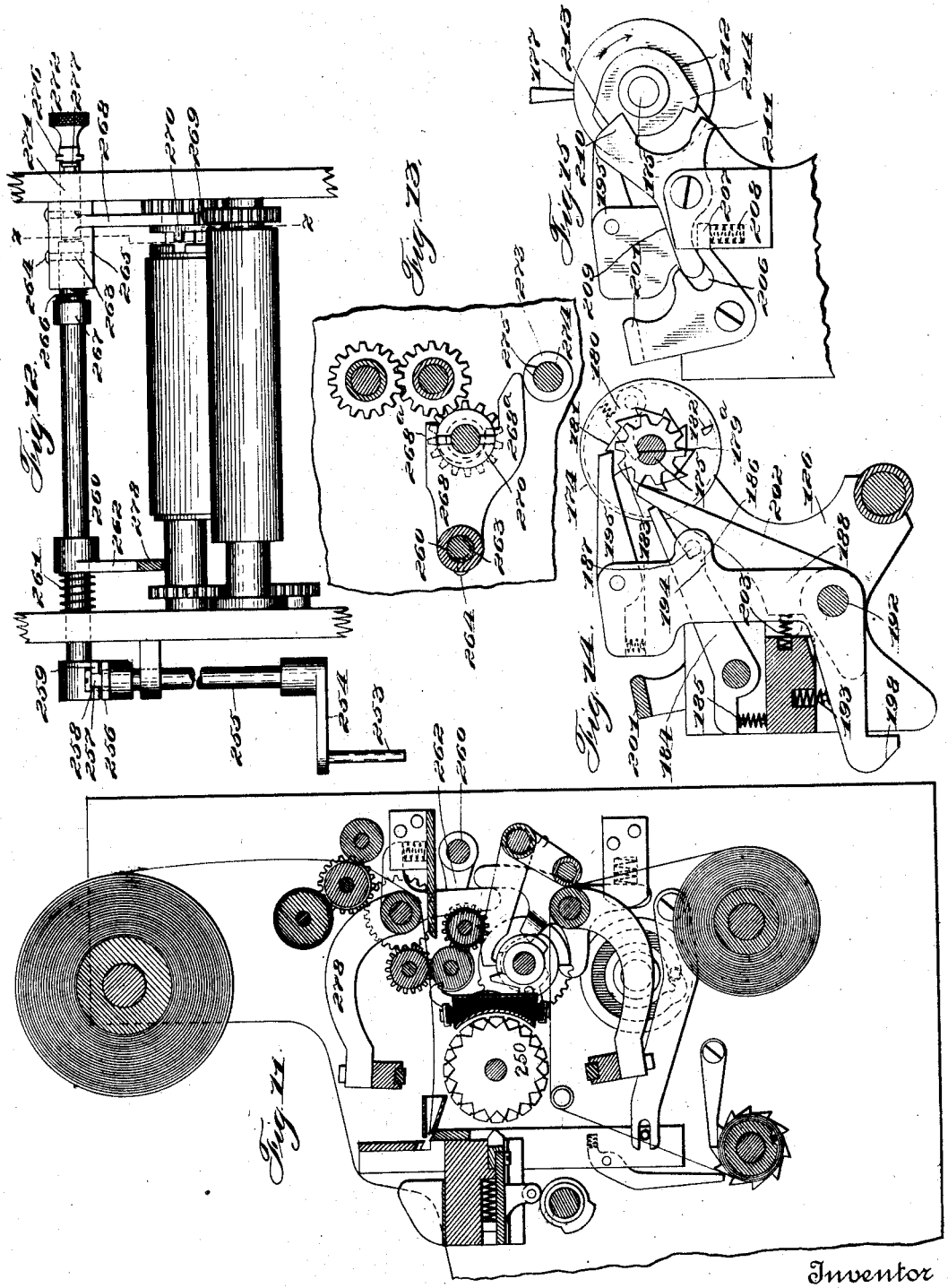

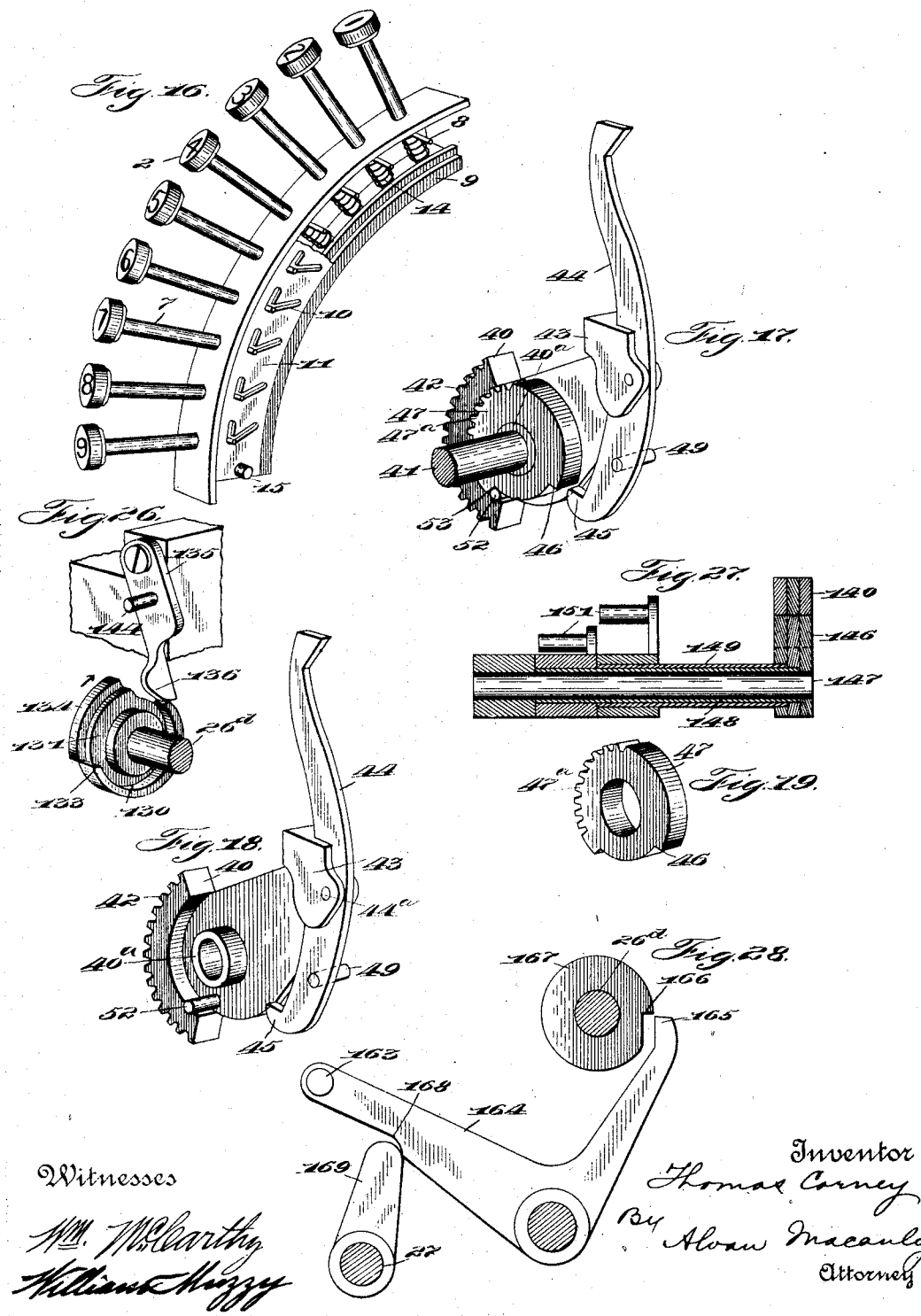

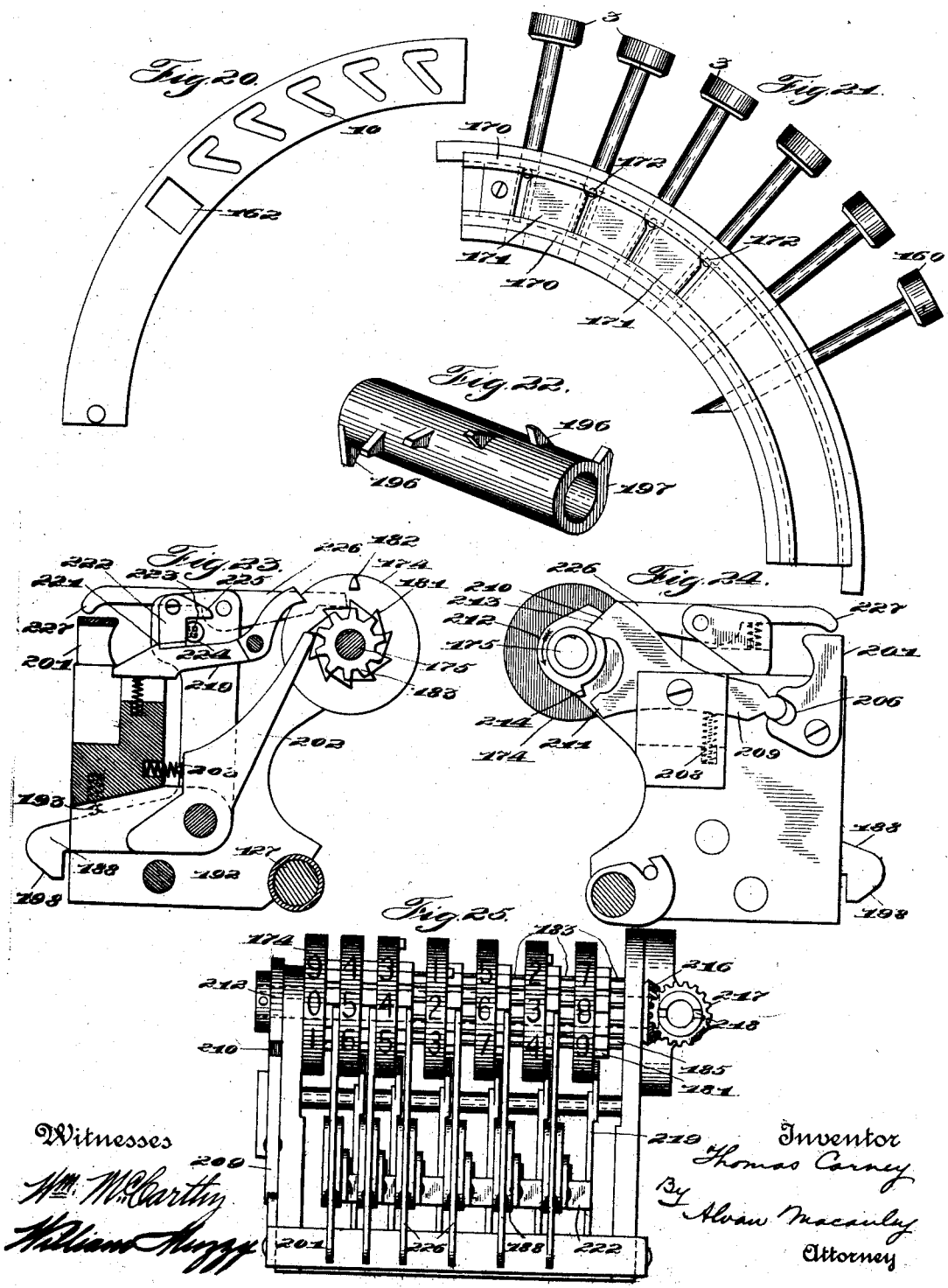

No. 884,639.
T. CARNEY.
CASH REGISTER.
APPLICATION FILED APR. 17, 1899.
PATENTED APR. 14, 1908.
14 SHEETS—SHEET 13.
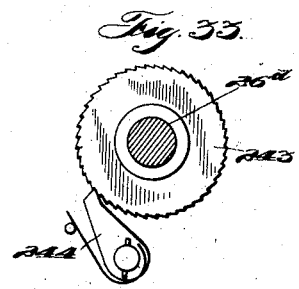
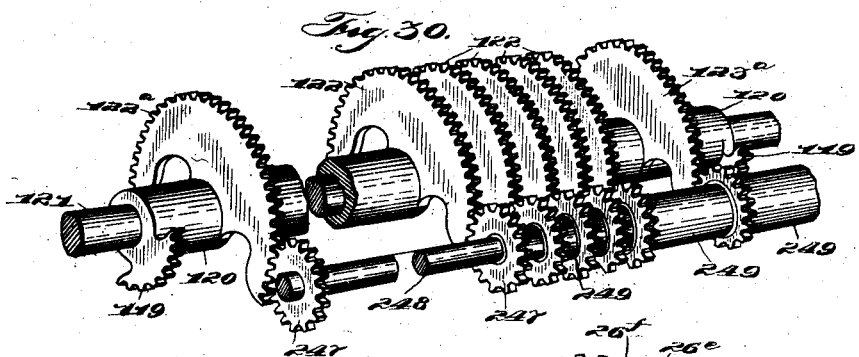
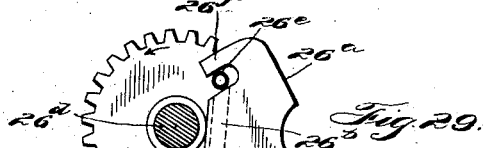
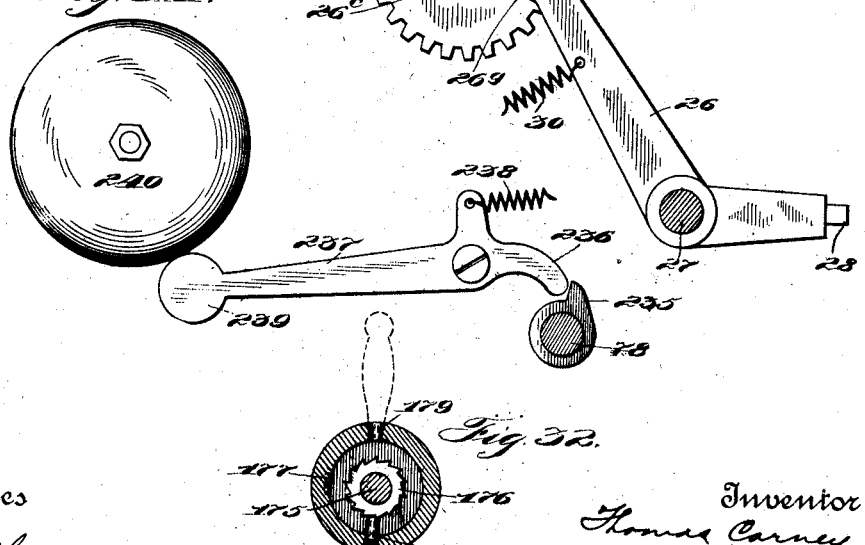
Witnesses
Inventor
Thomas Carney
By Alvan Macauley
Attorney

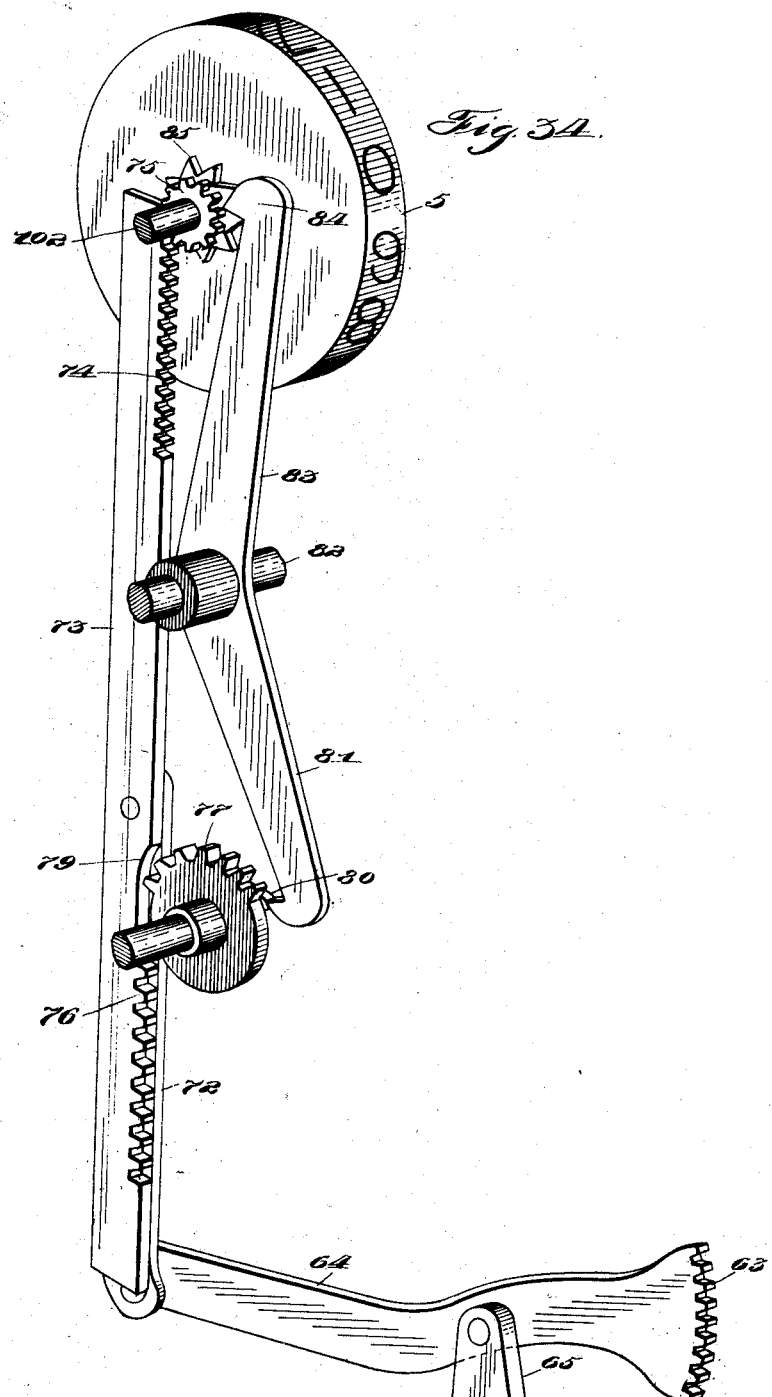

UNITED STATES PATENT OFFICE.

THOMAS CARNEY, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

No. 884,639.   Specification of Letters Patent.   Patented April 14, 1908.

Application filed April 17, 1899. Serial No. 713,340.

*To all whom it may concern:*

Be it known that I, THOMAS CARNEY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has more particular relation to improvements in registers of the multiple counter type.

One of the several objects of the invention is to provide an improved machine in which the amounts of the different kinds of transactions may be registered upon independent or department counters.

Figure 1:
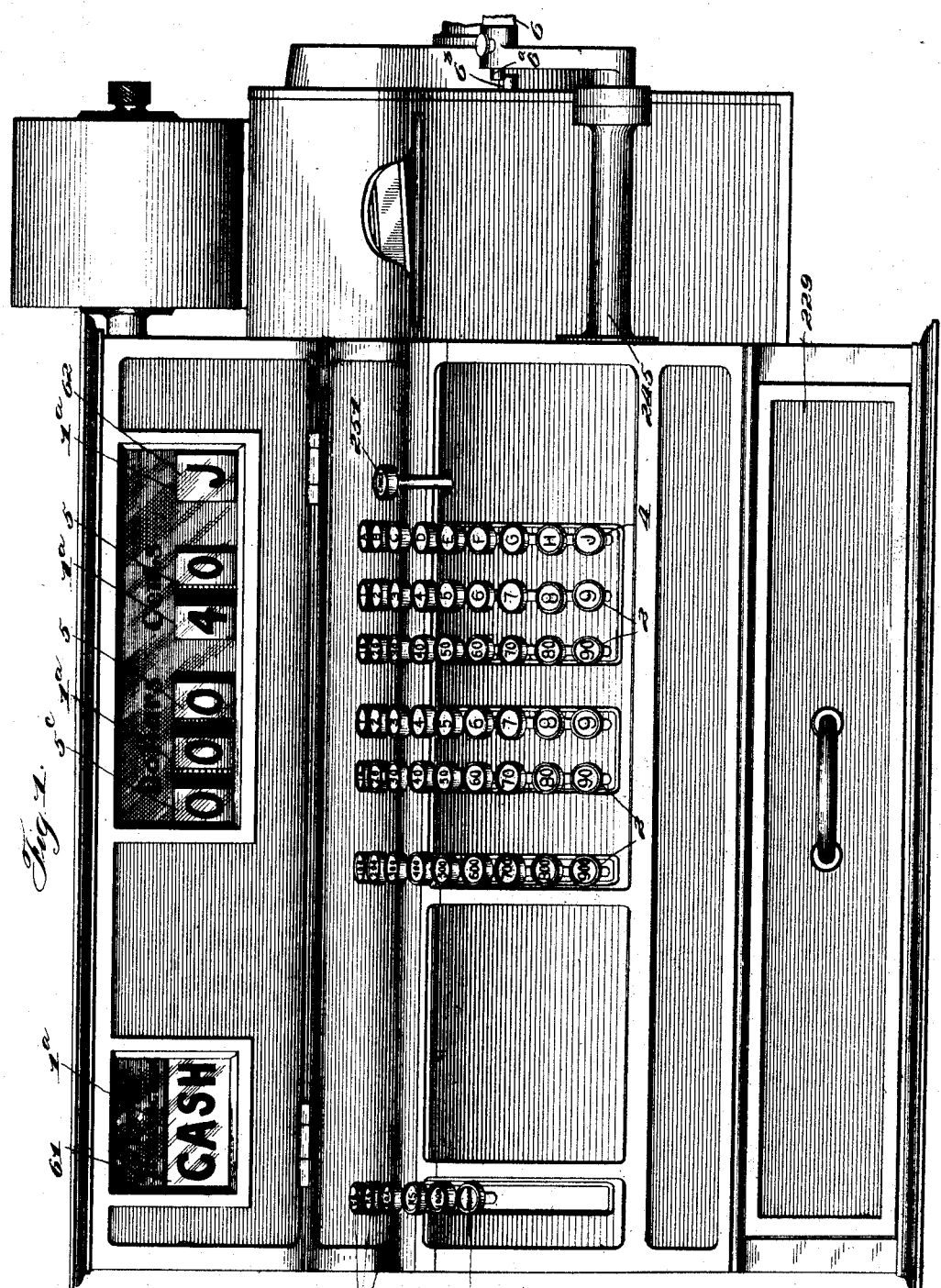
Figure 2:
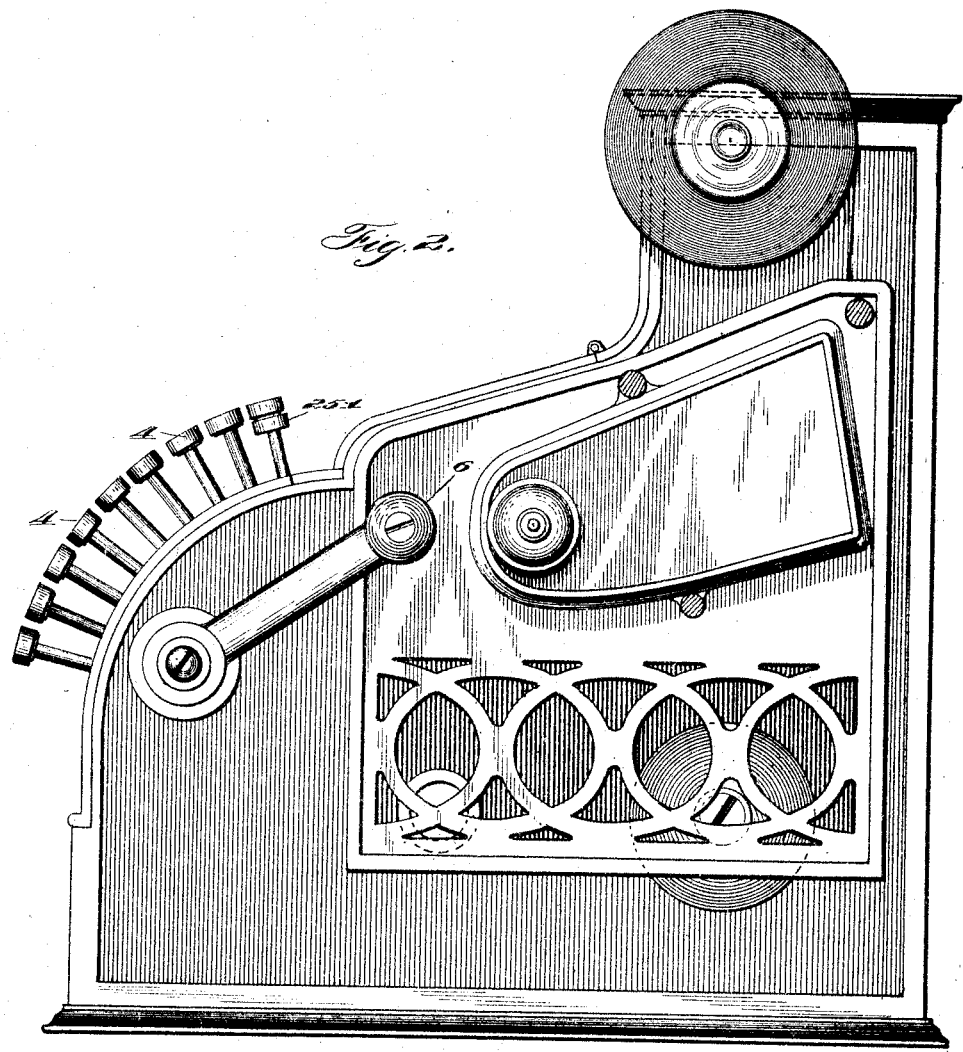
Figure 3:
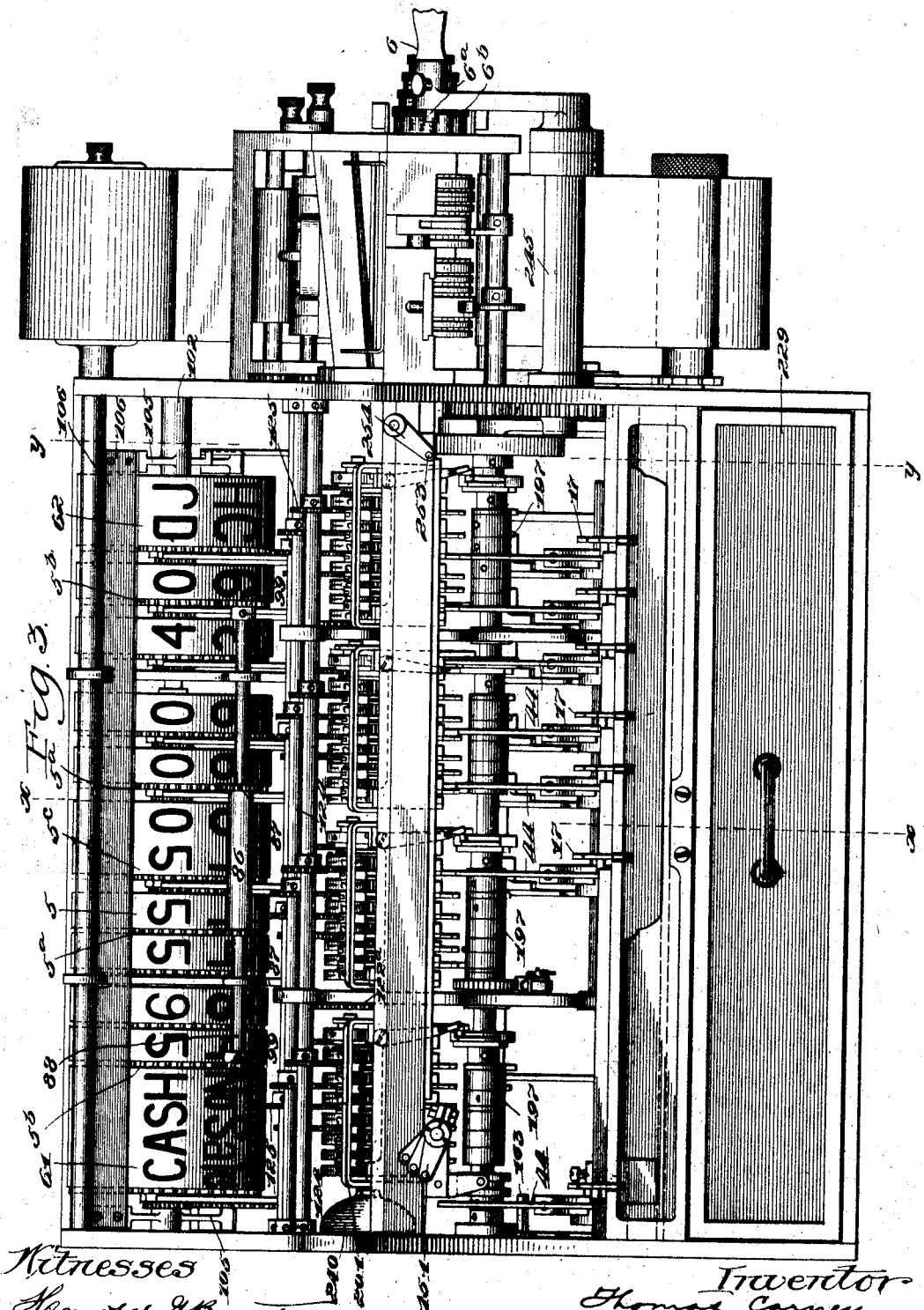
Figure 4:
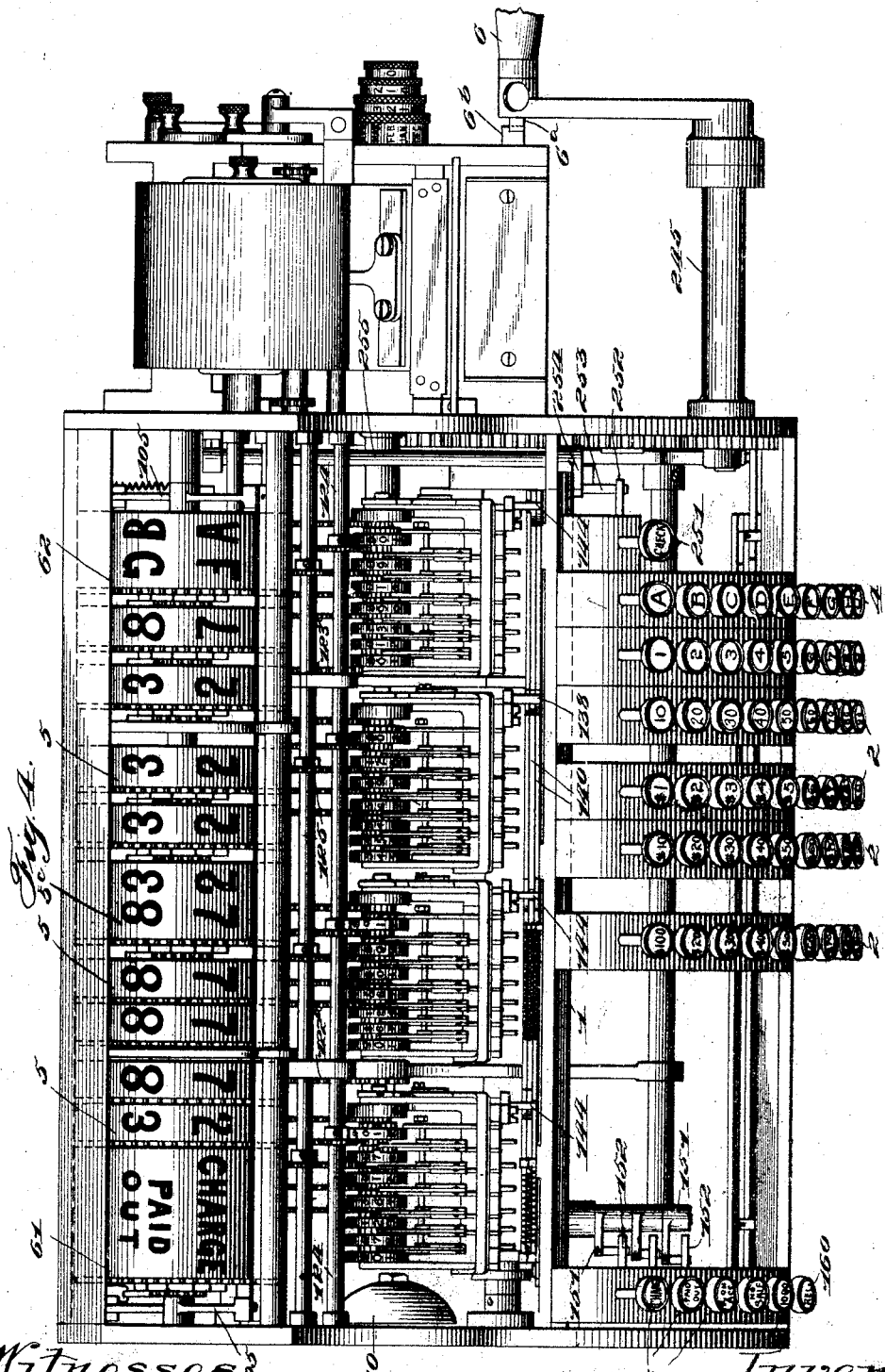
Figure 5:
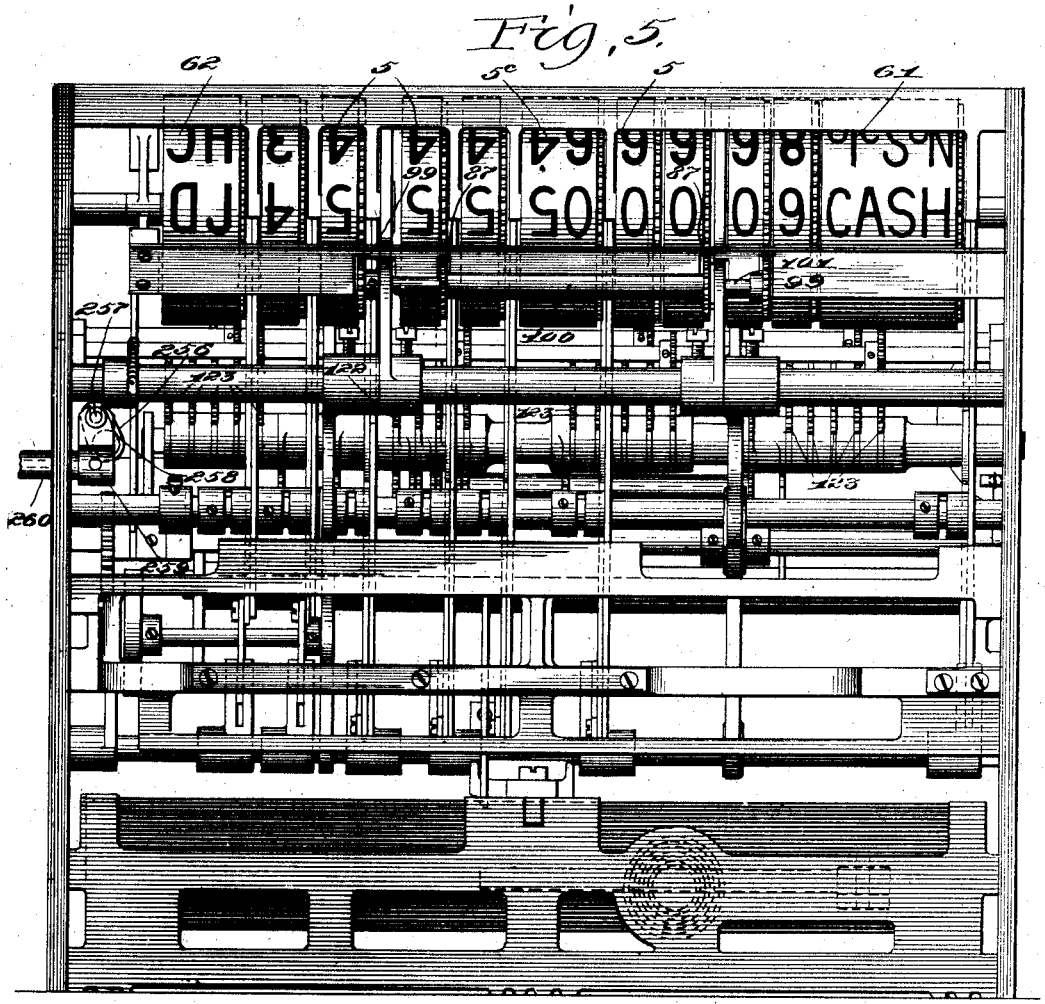

In the accompanying drawings forming part of this specification, Figure 1 represents a front elevation of the machine embodying my invention; the operating handle being broken away. Fig. 2 represents an end elevation of the said machine. Fig. 3 represents a view similar to Fig. 1 with the cabinet and the banks of keys, supporting frames, detents, etc. removed. Fig. 4 represents a top plan view of my improved machine with the cabinet removed. Fig. 5 represents a rear elevation of the same with the check printer, operating handle and other parts omitted for clearness. Fig. 6 represents a vertical transverse section through the machine on the line x—x of Fig. 3. Fig. 7 represents a similar view, looking in the opposite direction, and taken on the line y—y of said Fig. 3. Fig. 7ª represents a detail section taken on the angular line o—o of Fig. 7. Fig. 8 represents an enlarged detail front elevation partly in section and partly broken away, of the counters and coöperating devices. Fig. 9 represents a detail broken top plan view of the counter selecting or adjusting devices. Fig. 10 represents an enlarged detail vertical section through the machine taken just to one side of one of the banks of keys; the cash drawer and a number of the upper parts being omitted for clearness. Fig. 11 represents a vertical transverse section through the printing mechanism. Fig. 12 represents an enlarged detail top plan view of the devices for causing a check to issue or not as desired. Fig. 13 represents a detail section through these devices on the line z—z of Fig. 12. Fig. 14 represents a vertical transverse section through one of the counters detached from the machine. Fig. 15 represents an end elevation, partly broken away, of said counter. Fig. 16 represents a detail perspective view, partly broken away of one of the banks of amount keys, its detent, etc. Fig. 17 represents a detail perspective view of one of the driving members, its driven member and the connecting clutch. Fig. 18 represents a detail perspective view of one of the driven members and its clutch. Fig. 19 represents a detail perspective view of one of the driving members. Fig. 20 represents a detail side elevation of the detent of the left hand or special key bank (see Fig. 1). Fig. 21 represents a detail side elevation of said left hand bank of keys containing the keys for the special department counters. Fig. 22 represents a detail perspective view of one of the rotatable drums for operating the transfer levers. Fig. 23 represents a vertical transverse section through a modified form of counter. Fig. 24 represents an end elevation of the same. Fig. 25 represents a top plan view of said modified form of counter. Fig. 26 represents a detail perspective view of one of the counter shifting arms and its operating cam. Fig. 27 represents a detail vertical section through the nested sleeves and coöperating devices for shifting the counters. Fig. 28 represents a detail side elevation of the devices for locking the machine when the release key is operated. Fig. 29 represents a detail side elevation of the locking lever and the gear with which is coöperates; the cam groove in said lever being shown in dotted lines. Fig. 30 represents a detail perspective view of the operating rack segments and the nested sleeves coacting with and driven thereby for adjusting the printing wheels according to the operated key. Fig. 31 represents a detail side elevation of the bell and striker. Fig. 32 represents a detail vertical section through one of the wheels or disks for turning a counter to zero. Fig. 33 represents a detail side elevation of the full stroke device, and Fig. 34 shows one of the indicators and its operating devices.

In the aforesaid drawings 1 represents the various fixed parts of the frame of the machine, 2 the amount or value keys, 3 the special department counter keys, 4 the clerks' or initial keys, 5 the indicators and 6 the operating crank handle.

In general terms the construction comprises groups or banks of stop keys, duplicate register or counter operating devices arranged to be controlled thereby and a plurality of independent counters which are arranged to be moved into engagement with their respective sets of duplicate register operating devices at will.

All of the banks of amount or value keys except the last which contains the special and the $1000 keys are similar in construction and operation and I will therefore describe one only, as such description will suffice for all. The keys of each of these aforesaid banks are arranged in descending succession from one at the top of the bank to nine at the bottom, whether it be the units, tens, or hundreds bank. Each key comprises a numbered head or finger button and a shank 7 having a laterally projecting pin 8; said shanks being slidably mounted in a segmental grooved frame 9 which is fast to the main frame 1, so that the pins 8 project laterally from said groove and through angular slots 10 formed in a sliding detent plate 11 (see Figs. 10 and 16). Said detent plate is guided in its movements by suitable guide flanges formed on the segmental frame and is held in position on the frame by a guard and guide plate 12 secured to said frame and formed with radial slots 13 which receive and guide the ends of the pins 8. Coil springs 14 surround the shanks of the keys and bear with their opposite ends against the pins 8 and the inner wall of the groove in the segmental frame so as to normally hold the keys in their outer positions.

It will be observed from the above that when a key is depressed its pin 8 travels down the incline portion of its respective slot 10 and thus slides the detent 11 longitudinally. The detent upon being thus moved is caught in its lower position so that the operated key cannot return and the remaining unoperated keys, the pins of which then extend through the short arms of the angular slot 10, cannot be operated. To effect this locking or latching of the detent it is provided near its lower end with a laterally projecting stud 15 which extends into a slot 16 formed in a detent lever 17 so as to rock the latter when said detent is moved. This lever is provided with a notch 18 (see Figs. 8 and 10) which is adapted to receive the hook end 19ª of a latch 19 suitably pivoted on the main frame. This latch is normally forced laterally against the detent lever 17 by a coil spring 20 which is interposed between an arm 21 of said latch (see Fig. 9) and a portion of the main frame. The hook end of the latch, however, is never in engagement with the notch 18 of the lock lever 17 except when one of the keys in the bank is depressed. In that case, however, the front end of the lock lever being swung downward the latch engages the notch 18 and holds the operated key depressed, locks all the other keys in that bank or row and unlocks the driven member coöperating with that particular bank of keys, as shall be presently described.

Near the end of each operation of the machine the latches 19 are all tripped or forced backward against their springs to release the detent levers 17 by pins 22 mounted upon a transversely sliding bar 23 which in turn is movably mounted in the main frame (see Figs. 6 and 10). When the detent levers are thus released they are returned to normal position by coil springs 24 which are interposed between projections 25 of said levers and the main frame. The upward movement of the detent lever 17 causes all the detents to again assume their normal positions and thus to release all the keys. The aforesaid transverse sliding movement of the bar 23 is effected by a bell crank lock-lever 26 which is mounted rigidly upon a transverse shaft 27 and is formed at one end with a stud 28 (see Figs. 7, 7ª and 29). This stud projects into a diagonal slot 29 formed in the end of the bar 23 as shown in Fig. 7ª so that when the lever 26 is operated said bar will be moved by the stud engaging the walls of said slot. In order to cause this oscillation of the lever 26 near the end of each operation of the machine I have formed the upper end of the long arm with a head 26ª having a cam groove 26ᵇ, as more clearly shown in Fig. 29. A gear wheel 26ᶜ mounted upon a rotation shaft 26ᵈ is provided with a stud and antifriction roller 26ᵉ which is adapted to coact with the lever 26, groove 26ᵇ and a hook 26ᶠ formed on the end of said lever. The lever normally occupies the position shown in Fig. 29 with the hook 26ᶠ engaging the roller 26ᵉ and locking the gear 26ᶜ.

In the operation of my machine the gear 26ᶜ makes a single complete revolution whenever an amount is registered, from which it will readily be seen that so long as the hook 26ᶠ of the lock lever 26 engages the stud 26ᵉ the machine will be absolutely locked. And in the preferred arrangement of my machine as shown in the drawings, the pressing of the cash or value keys or of the special keys in the left hand bank does not release these locking devices. They can only be released by pressing one of the initial keys 4. This, as will be readily understood, is for the purpose of compelling the operator to press his initial key before he can register any transaction. To this end the bar 23 near its right hand end and just under that one of the detent levers 17 which coöperates with the initial bank of keys, is provided with an upward extension 34 (see Fig. 8) which has upon its left hand side and directly in the path of travel of the said detent lever 17 an incline 34ª, from which it follows that whenever one of the initial keys is pressed, its detent lever being forced downward strikes the incline 34ᵃ and slides the bar 23 to the right. This operation, through the diagonal slot 29 and the stud 28 playing therein, swings down the front end of the lock lever 26 and consequently rocks the long arm of said lock lever against the stress of its spring 30 so that the hook 26ᶠ is swung away from the stud 26ᵉ of the gear 26ᶜ; consequently the entire machine may then be operated.

The sliding bar 23 is only provided with one incline 34ᵃ and consequently the operation of the keys in any bank other than the initial bank does not operate to move said bar. The depressing of an initial key, however, does not move the said bar 23 to the right sufficiently that the pins 22 carried thereby should strike or release the catches 19, although the movement is sufficient to release the mechanism of the machine, as already related.

It will readily be seen from the description just given that when the driving handle is operated and the gear 26ᶜ thereby turned, that as the stud 26ᵉ, traveling in the direction of the arrow (see Fig. 29) has almost completed its revolution it will strike the incline 26ᵍ and thereby move the lock lever against the stress of its spring 30, and later said stud will enter the cam groove 26ᵇ and by moving therethrough will return the lock lever to normal position. This movement of the lock lever 26 of course causes the stud 28 thereby to descend through the incline slot in the bar 26, whereby the latter is shifted laterally, which causes the pins 22 to strike and retract the latches 19, whereupon the springs of the detents return the latter to normal positions thereby permitting the keys to spring up to their normal positions. The stud 26ᵉ finally becomes again locked against the hook 26ᶠ.

The aforesaid detent levers 17 are journaled upon a transverse shaft 35 and each is formed with a segmental toothed arm 36 and a locking arm 37 (see Figs. 6 and 10). This latter arm normally acts as a stop for the shoulder 38 of a cam 39 which latter is fast to a sleeve 40ᵃ of a driven member 40. This member is journaled upon a transverse shaft 41 and is provided with a segmental gear 42 and a slotted arm or extension 43 in which latter is pivoted a registering lever 44. (See details in Fig. 18). The upper end of this lever is adapted to contact with and be stopped by the inner end of any key that may be pressed, as shown in broken lines in Fig. 10, and thus disengage its lower hook end 45 from the shoulder 46 formed on a driving member 47 which is journaled upon the extending end of said sleeve 40ᵃ. (See Figs. 17 and 19). The registering lever is pivoted between its ends at 44ᵃ in the extension 43 of the driven member and near its hook end 45 is provided with a laterally extending pin 49, and a coil spring, shown in broken line in Fig. 10, tends at all times to throw the upper end of the registering lever forward. Normally, however, said pin rests in a notch or slot 50 formed in the detent lever 17, though when any key in the coöperating bank or row is pressed the rear end of the said detent lever is raised as already described and the registering lever is thereby released and the hook end immediately is forced by the spring 48 under the shoulder 46 of the driving member. If the crank handle or other driving means be then started the driving member will immediately begin to travel in the direction of the arrow (see Fig. 10) and the driven member being locked to said driving member by the engagement of the registering or clutch lever with the latter, both the driving member and the driven member carrying the registering lever will be swung forward until the swinging end of the registering lever 44 strikes the inner end of the operated key, whereupon the hook 45 will be rocked out from under the shoulder 46 of the latter, as will be readily understood. The driven member will thereupon come to a stop, but the driving member will continue its full excursion.

The driven member 40 it should be noted is hollowed out and the driving member turns therein upon the sleeve 40ᵃ and thus the shoulder 46 of the latter is brought into alinement with and in position to be engaged by the hook 45 of the registering lever. A segmental gear 47ᵃ is formed on the driving member and engages with the corresponding gear 55 of the oscillating arm 54, which is rigidly secured at its upper end to the rock shaft 56. It results from this construction that each time the crank or other driving means of the register is operated the driving member 47 is given a constant excursion, first down and then back to normal position. When the lever 44 is arrested as above described its pin 49 becomes locked against rebound between two of the teeth of the arm 36 and is held so locked by the hook end of said lever bearing against the periphery of the driving member.

The return movement of the driven member is effected by a pin 52 fast thereto and coöperating with a shoulder 53 formed on the driving member and adapted to contact with and move said pin upon the return stroke of said latter member. When the driven member is thus stopped by an operated key the driving member moves on to the extreme limit of its excursion and then begins its return movement toward normal position, the hook 45 meanwhile riding upon the smooth periphery of the driving member. During the return movement of the driving member the shoulder 46 thereof will return to the point at which it was disconnected from the driving member and as it passes this point the hook end of the registering lever will spring under the said shoulder 46 and simultaneously the shoulder 53 will contact with the pin 52 of the driven-member and thereby the driving member will carry the driven member with it to normal position.

As before stated, at every operation of the machine the gear 26ᶜ (shown in Fig. 29) is given a complete revolution which at a certain time rocks the lock lever 26 which simultaneously slides the bar 23, which in turn retracts the latches 19, thereby releasing the detent lever 17. This latter operation is aimed to occur just after the driven member is returned to normal position, so that upon its release its rear end is thrown downward and the incline walls of the slot 50 thereof contact with the pin 49 carried by the registering lever and causes it to enter said slot 50, thereby rocking the hook end of the lever out of engagement with the shoulder 46, or in other words, disengaging the driving and driven members. When the detent lever 17 is thus released and the pin 49 engaged by the slot 50 thereof, the rear end 37 of said lever again falls in front of the cam 39 and thereby locks that part of the registering mechanism which coöperates with its particular bank or row of keys until one of said keys is again operated.

All of the arms 54 of the respective banks are mounted fast upon a transverse rock shaft 56 whereby upon the movement of said shaft the arms will be simultaneously operated to actuate their respective driving members.

The shaft 56 receives its rocking motion during each operation of the machine by means of an arm 57 (see Fig. 7) fast thereto and carrying an anti-friction roller 58 which plays in a cam groove 59 formed in a disk 60 mounted rigidly on shaft 26ᵈ. The form of the cam groove 59 is such that the arm 57 is first elevated and then depressed to give the shaft 56 the desired rocking movement.

Having thus described the devices for securing the variable movements of the driving and driven members according to the value of the keys operated I will now describe the devices for communicating such movements to the indicators, the several counters, and the printer.

The rotary amount indicators 5 as will be seen by reference to Fig. 3 are journaled on a shaft 102 side by side in two sets, one for the front indication and the other for the back indication while special indicator 61 and clerk's initial indicator 62 for indicating respectively special kinds of transactions and the initial of the clerk recording it are arranged at the opposite ends of said amount indicators. As the said amount indicators are all operated in substantially the same manner by duplicate mechanisms set in motion by their respective driven members I will describe one of said connections only, as this description will also cover the remaining duplicate mechanisms.

The indicators respectively receive their movement from the several driven members through intermediate gearing which in the normal position of the machine is in operative engagement, but as soon as the driven member begins to move, this connecting mechanism is disengaged so that all of the indicators immediately return to zero position and the driven member moves independent thereof until the registering lever strikes an operated key, whereupon the driven member is brought to a standstill and so remains until it is picked up by the driving member on its return movement. While, during the operation of the machine the driven member is thus at rest, the said connecting mechanism from the indicator is thrown into mesh or operative connection with the driven member so that as the latter returns to normal position the indicator is thereby moved to indicating position. To this end an indicator actuating lever 64 is pivoted between its end in a rocking arm 65. At its forward end said actuating lever bears a segment rack 63, which, as stated, is normally in engagement with the driven member, as may be seen by reference to Fig. 6. At its rear end said actuating lever is pivoted to the indicator link bar 72 and the latter at its upper end is pivoted to the indicator rack bar 73 which is provided with a rack 74 near its upper end which meshes with a pinion 75 secured rigidly to the indicator 5.

Each bank of keys, as shown in Fig. 6, has coöperating with it a driving member, a driven member with a registering or clutch lever, an indicator and the connecting mechanism heretofore described. All of the indicator actuating levers 64 are pivoted upon the arms 65 which are all rigidly secured near their lower ends upon the rock shaft 66, so that whenever the machine is operated, as the shaft 66 is rocked, the actuating levers 64 are thrown first out of and then back into engagement with the segment rack which is carried by the driven member.

The rock shaft 66 is rocked or oscillated once during each operation of the machine by an arm 67 (see Fig. 7) fast thereto near one end. This arm is provided with an anti-friction roller 68 which projects into a cam groove 69 formed in a disk 70 fast to a rotation shaft 71. By this means the indicator actuating lever is held to mesh with the gear 42 only during the downward movement of the latter and is retracted to disengage therefrom upon the reverse movement of said gear. The rear end of the lever 64 is pivotally connected to a link bar 72 which in turn is pivoted to a vertical slide 73 suitably mounted in the main frame (see Fig. 6). This slide is formed at its upper end with a rack 74 which meshes with a pinion 75 fast to one of the indicators 5 whereby the movement of said slide in either direction will rotate said indicator correspondingly to bring the proper characters which are marked on the periphery of the same into view through the sight openings 1ª in the front of the cabinet. The indicator slide is further formed with a lower gear 76 which is adapted to be engaged by a segmental gear 77, to draw the said slide down to its normal position and return the indicator to zero. Said gear 77 is fast to a rotation shaft 78 which gives it one complete revolution upon each operation of the machine, and thus always draws the slide down should the same be in any of its different elevated positions. If the slide has not been previously raised and is in its lower position the teeth of the gear 77 will pass freely through a notch 79 formed in the edge of the slide above the teeth 76 and thus will not actuate said slide. A recess 72ª is formed in the link bar 72 on its rear side and near its lower end and is adapted to receive a spring pressed latching stud 72ᵇ which is suitably mounted in the main frame so as to normally project into the path of the lower curved end of said link. When the slide 73 descends and is stopped by striking a flange 72ᶜ formed on the frame, said stud 72ᵇ snaps into the recess 72ª and thus prevents any rebound of the slide. Subsequent to the descent of the slide the link 72 is moved forward to disengage from the stud by the longitudinal movement of the lever 64 to which it is attached. A cam 80 (see Fig. 6) is mounted fast on said shaft 78 and coöperates with the lower hook end of a lever 81 which is fast upon a rock shaft 82. This shaft carries a series of arms 83 having V-shaped alining noses 84 adapted to engage alining star wheels 85 mounted on the respective indicators. By means of these alining devices the indicators are always brought to rest and locked with the exposed indicating numerals in exact alinement with the sight apertures 1ª of the cabinet through which they are visible. As the amount indicators are arranged in duplicate sets and as only one of said sets is operated directly by the slides 73 the remaining set must be suitably coupled thereto so as to move correspondingly. As both the front and back one hundred dollar indications lie side by side they are formed on the same indicator 5ᶜ, said indicator being made of double width to accommodate the double row of characters.

There are two parallel series of figures extending about the periphery of this particular indicator 5ᶜ, which series consists of twenty figures, as follows; 0, 1, 2, 3, 4, 5, 6, 7, 8, 9, 0, 1, 2, 3, 4, 5, 6, 7, 8, and 9. By reference to Fig. 1, it will be seen that when the case is on the machine, only those of the indicators 5 which are on the right of the said indicator 5ᶜ are visible through the front of the case of the machine. A rear view of the machine with the case on is not shown, but it will be readily understood that the back of the case is provided with an opening through which the left half of the indicator 5ᶜ and those of the indicators 5ᶜ, which are to the left of said indicator 5ᶜ, are visible.

The clerks' initial indicator 62 is provided with two parallel rows of letters extending about its periphery, each of which consists of the letters designating the keys shown in the right hand row, as shown in Fig. 1. The opening in the front of the machine is so arranged that only one letter of one of these series is visible at a time, and the rear of the case of the machine is so arranged that only one letter of the other series is visible at a time; and the disposition of the letters on the periphery of the indicator is such that when a certain designating letter, say for example "J", of one series, is visible from the front of the machine, the letter "J", of the other series, will simultaneously be visible through the opening in the rear of the case of the machine.

The duplicate tens of dollars indicators are provided with gear wheels 5ª and are coupled so as to move together by a sleeve 86 (see Fig. 3) provided at opposite ends with pinions 87 that mesh with said gear wheels 5ª. This sleeve is loosely mounted upon a rotary shaft 88 which is suitably journaled in the frame and is provided at its opposite ends with pinions 99. These pinions mesh with gears 5ᵇ mounted on the units of cents indicators so as to cause the same to move together. The units of dollars indicators are coupled by a sleeve 100 (see Fig. 5) in the same manner as the tens of dollars indicators while the tens of cents indicators are coupled by a shaft 101 in a similar manner to the units of cents indicators.

The indicator 61 for the special operations and department counters represented by the left hand bank of keys is operated in connection with said keys in substantially the same manner as the amount banks with the exception that duplicate words or characters are formed upon the opposite sides of said indicator so as to indicate the character of the transaction at both the front and the back of the machine by a single indicator. This indicator is operated from its key bank in a similar manner to all the other indicators.

In order to hide the indicators while they are being moved from one position to another and to prevent a premature exposure thereof, I journal two levers 105 upon the indicator shaft 102 and at opposite ends of the series of indicators (see Figs. 3 and 7). Secured to the opposite ends of these levers are two flashes or shutters 106, and in the normal position of the machine these shutters are moved so as to expose the numbers on the indicators. The movements of said flashes is accomplished by a pivoted lever 107 which is slotted at its upper end to receive a pin 108 mounted upon a projection of one of the arms 105. A coil spring 109 connects the lever 107 to the frame and tends to cause the flash 106 to normally hide the indications. Said lever is however provided at its lower end with a nose 110 which coöperates with a cam 111 mounted upon a rotation shaft 112 of the machine. When the machine is in normal position the nose 110 rests against this cam and the lever is tipped against the tension of its spring, with the flash in the positions shown in Fig. 7. When an operation of the machine is commenced the cam 111 immediately disengages from the nose 110 and thus permits the spring 109 to move the flash to position to hide all the indicators. Said flash remains in this position until the machine has made a complete operation when the cam 111 again forces the nose 110 outward and thus operates lever 107 to uncover the indicators.

As before stated whenever the machine is operated the driving members make a fixed and constant excursion while the movements of the driven members are greater or less according to the values of the keys operated. These gears 42 of the driven members are of sufficient width to mesh with the gears 63 and also with segmental gears 113, (see Fig. 10). Each of these latter gears is formed upon the downward end of an arm 114 and each of said arms is fast to a sleeve 115, journaled upon a transverse shaft 116. Each of the sleeves 115 is provided with a short arm 117 having a segmental gear 118 formed thereon. This gear 118 in each case meshes with a segmental gear 119 formed on a sleeve 120 which latter is journaled on a shaft 121 and is provided with a primary counter driving gear 122. As there are five banks of amount keys there are of course five of the primary gears 122 beside the similar gears, hereinafter described for the special bank (see Fig. 30).

As my machine, as shown in the drawings, comprises five rows or banks of value or amount keys, there must, of course, be five primary counter driving gears. All these actuate the adding wheels of that counter which is the third from the left hand end of the machine, as shown in Figs. 3 and 4. As there are four counters in my machine, there are provided four sets of counter driving gears, of which only one set comprises the primary driving gears 122, heretofore referred to, and three sets of secondary driving gears 123. I call the gears 122 "primary driving gears", and the gears 123 "secondary driving gears", because the former receive motion from the crank 6 and transmit it to the latter, which are connected with the driving mechanism of the register only through the primary driving gears.

It will be understood that all of the counters are normally swung toward the front so that they do not normally engage their respective counter driving gears, except when swung backward during the operation of the machine, as will be presently described.

For convenience, I shall hereafter refer to that one of the counter driving gears which turns the cents adding wheel, as the cents counter driving gear, and that one which turns the dimes adding wheel as the dimes counter driving gear, etc.

As before described, means are provided for coupling all the cents counter driving gears so that they will always move together; likewise, the dimes counter driving gear and the dollars counter driving gear, etc., are respectively so coupled together; and this is done in the following manner: The four cents counter driving gears are rigidly keyed or otherwise fastened to the shaft 121, whereby when one movement is transmitted from the crank 6, or other driving mechanism, to the primary cents counter driving gear, all the other counter driving gears are moved simultaneously to the same extent. All the other counter driving gears are journaled upon the shaft 121.

Extending transversely across the machine and just above the various sets of counter driving gears, are four rotary shafts 124 each of which bears four pinions. That one of these rotary shafts 124 which is nearest to the front of the machine, as shown in Fig. 6, has its pinions 125 engaging respectively with the dimes counter driving gears. The pinions on the next or second rotary shaft 124 engage respectively with the dollars counter driving gears, the pinions in the third rotary shaft 124 engage respectively with the tens of dollars counter driving gears and the pinions in the fourth rotary shaft 124 engage respectively with the hundreds of dollars counter driving gears (see Figs. 3 and 6). It will be seen from the above description that, if, say the nine cent key were pressed and the crank 6, turned all of the cents counter driving gears 122 and 123 will be actuated to a degree sufficient to register nine cents upon the counter which has been adjusted to be thrown into mesh with its respective set of counter driving gears.

The counters are similar in construction and operation and I will therefore describe one only as this description will suffice for all. Each of said counters is mounted upon a rocking frame 126 (see Fig. 10) which frame is journaled upon a transverse shaft 127. The front part of said frame is supported in position by an anti-friction roller 128, (see Figs. 8 and 10) mounted on a downwardly extending arm 129 of the same and normally resting in a groove 130 formed in a cam disk 131 which is fast upon the revolution shaft 26ᵈ (see Fig. 26). The outer wall of the groove 130 only extends about a portion of the disk, thus leaving a free space through which the roller 128 may pass when the frame 126 is rocked rearwardly as hereinafter described. One end of said outer wall of the groove is beveled as at 133 (see Fig. 26) so as to strike the roller 128 when the same has previously been elevated by the rocking of the frame and thus return the frame and cause said roller to again pass into the groove. It will be observed that the groove holds the roller 128 during the greater portion of the revolution of the cam disk and thus locks the counter frame from being accidentally or otherwise rocked rearward during this period. The rocking or throwing of the frame rearward into mesh with its counter driving gear is accomplished by the cam portion 134 of the disk 131. It will be observed by reference to the drawings that this cam portion is of slightly less length than the omitted portion of the wall of the groove 130 and terminates substantially in alinement with the beveled end 133 of the wall. The frame 126 is also provided with a pivoted pendent shifting arm 135 (see Figs. 8, 10 and 26) having a beveled nose 136 at its lower end. By reference to Fig. 8 it will be seen that this nose normally lies to one side out of the path of the cam portion 134 of its respective cam disk and also out of alinement with the wall of the groove 130 so that the counter frame will not be thrown rearward upon the rotation of the cam disk while the arm 135 is in this position. This description applies to all of the counters except the second from the right hand end as shown in Figs. 3 and 8 which as will be seen from said Fig. 8 is normally in operative position with its shifting arm 135 in alinement with the throwing cam portion 134 of its cam. For the machine as illustrated in the drawings, this is the cash counter, that is, the counter upon which it is intended to record cash sales. This arm 135 of the cash counter is held normally in the above described position by a coil spring 137 mounted on the counter frame and engaging the side of said arm which is arrested in the proper position by a pin 138 mounted on the same and projecting through coincident notches 139 formed respectively in three sliding, shifting bars 140 (see Figs. 8 and 9), which are movably mounted upon the main frame by means of screws 141 which project through elongated slots 142 formed in said bars. Coil springs 143 connect the respective bars to the main frame so as to normally draw said bars to the right into the positions shown in Figs. 8 and 9. Should one of said bars be moved to the left, the arm 135 of the cash counter will also be moved to the left and out of alinement with its cam 134, by the wall of one of the notches 139 engaging and moving its pin 138, which will thus prevent the throwing into engagement of said counter upon the operation of the machine. Each of the remaining three shifting arms 135 is provided with a pin or stud 144; said studs being connected respectively to the shifting bars 140 so as to receive motion from the same.

The cash counter, as has been already stated, is normally in position to be engaged by the actuating mechanism when the machine is operated as has been heretofore related. There are three other counters which are denominated special counters, and which are normally not in position to be engaged by the counter driving gears. But when a special key controlling one of the special counters is pressed, the cash counter must be thrown out of operative position and the particular special counter into such operative position. To accomplish this the three shifting bars 140 are respectively arranged, when slid to the left, to throw the cash counter out of operative position and to throw its particular special counter into such operative position. The front one of the shifting bars cooperates with the counter at the left hand end of the machine, as shown in Fig. 8. The middle shifting bar cooperates with the next adjacent or second special counter. The third counter is the cash counter and whenever any one of the shifting bars is operated, it throws said cash counter out of operative position. The fourth counter, that is, the one at the right hand end, as shown in Fig. 8, is shifted into and out of operative position by the third or rear-most one of the shifting bars.

It will be seen from the above that upon the movement of any one of said bars 140 the respective arm 135 which is operated by said bar will be moved into operative position in relation to its cam 134 while the arm of the cash counter will be moved out of such operative position as above described. When one of the shifting arms 135 is in operative position as above described the rotation of the shaft 26ᵈ will cause the cam 134 which cooperates with said arm to contact with the inclined end 136 of said arm and thus force the same upward and rock the frame 126 on its journal shaft 127 to bring the pinions of the counter wheels hereinafter described, into mesh with the counter driving gears 122 or 123. As the disk 131 continues its rotation the end of the shifting arm 135 travels along the periphery of the cam portion 134 until it reaches the end of the same when it is free to return to its normal position. This return of the arm is effected as before described by the inclined end 133 of the wall of the groove in said disk striking the roller 128 and drawing the same down. The shifting of the bars 140 to cause the proper counter to be set for operation is effected by a series of rock arms 146 mounted respectively upon the inner ends of a rock shaft 147 and nested rock sleeves 148 and 149 applied over the same; the ends of said arms projecting respectively into flaring notches 150 formed in the under sides of the bars (see Figs. 4, 8, and 27). The said shaft 147 and sleeves 148 and 149 are provided respectively upon their forward ends with crank arms 151 which are adapted to be engaged and operated by laterally projecting pins 152 mounted on the shanks of the respective special keys 3. By means of these devices the operation of one of said special keys will shift its respective bar 140 and thus put the counter representing said key in condition to be moved forward to receive the registration when the machine is operated, and will put the cash counter out of such position as already explained.

In order to prevent the operation of any one of the special keys 3 after the movement of the machine has commenced I mount a grooved locking wheel 153 fast upon the shaft $26^d$ (see Fig. 8) in such position as to receive a pin 154 projecting from the lower end of a pivoted angular lever 155 mounted on the main frame. The lower end of the lever is normally thrown toward the left against the left hand wall of the notch in the locking wheel 153, by a coil spring 156 which connects the locking lever to the frame so as to bring a pin 157 mounted on said lever into contact with the ends of the bars 140. One flange of the locking wheel 153 is formed with a notch 158 which normally lies in alinement with the pin 154. If one of the bars 140 is moved longitudinally to the left it strikes the pin 157 and thus rocks the lever 155 which action causes the pin 154 to pass out through the notch 158 so that when the movement of the wheel 153 is commenced the pin cannot again return to its normal position until said wheel has made a complete revolution. If one of the bars 140 has not been moved before the operation of the machine the pin 154 will remain in the groove of the wheel 153 and after the movement of the machine has commenced it cannot be forced laterally by the operation of one of the bars by a special key until the operation of the machine is complete.

It will be observed by reference to Fig. 4 that the last bank of keys contains the special keys 3 representing "charge," "paid out," "received on account," and also a "no sale" key, a "one thousand dollar" key and a "release" key. As this special bank of keys does not register but simply indicates and prints it is necessary that the segment $122^a$ of the same (see Fig. 4) which is operated similarly to the segments 122 be located out of alinement with any of the counters and to accomplish this result the sleeve 115 which belongs to this particular bank is lengthened so as to bring the segment $122^a$ to the right of the first counter. The release key 160 of said special bank is adapted to release any other key of the machine excepting the check key hereinafter described, before the operation of the crank handle has commenced. This key is mounted similarly to the remaining keys of the bank with the exception that its guiding pin 161 projects through a square aperture 162 formed in the detent of this bank, (see Fig. 20), so that said key will not coöperate with said detent but will immediately return to normal position upon being relieved of the pressure of the finger. The end of the shank of said key is beveled as shown in Figs. 6 and 21 and coöperates with a pin 163, mounted on a bell crank locking lever 164 journaled on shaft 41, to throw the rear arm of said lever forward. This rear arm is formed with a locking nose 165 which, when the lever is rocked forward engages with a locking shoulder 166 formed on a disk 167 fast to the rotation shaft $26^d$ (see Fig. 28) and thus locks the machine as long as the release key remains depressed. Said lever 164 is formed on its under side with an incline shoulder 168 which, when said lever is depressed, engages and rocks an arm 169 fast to the shaft 27 which carries the locking and tripping lever 26. The movement of the lever 26 as before described releases all the operated detents and thus allows all the keys to return to normal position. This release key is intended for correcting mistakes such as operating the wrong keys through carelessness or accident.

The frame supporting the bank of special keys above mentioned is provided with guiding flanges 170 (see Fig. 21), under which are mounted slidable stop plates 171 having their upper corners beveled as shown. The plates coöperate with pins 172 mounted on the four upper keys of the bank so that when one of said keys is operated its respective pin will engage the bevel corners of the plate or plates beneath it and force them to one side. This action brings all the other adjoining edges of the plates together so that none of the other key pins can descend between or to one side of them until the first mentioned pin has returned to normal position.

The one thousand dollar key which is mounted in the above mentioned special bank does not register or indicate but is simply intended for use by the proprietor in striking totals on the detail strip. The special transaction keys as well as the no sale key and thousand dollar key above mentioned are arranged to operate a printing segment to print designating characters upon the detail strip as hereinafter described and in substantially the same manner as the remaining banks of keys.

As has before been stated the cash counter is thrown into operative position upon the operation of the machine if none of the special keys are operated to move one of the slides 140. If one of said slides is moved to register a special transaction such as "paid out," "charge," etc. the slide is held in the position to which it is moved by the special key so that when said key is released the slide returns to normal position and the cash counter is again brought into operative condition.

The aforegoing description relates to the devices for operating the counters according to the amounts of the keys operated and the character of the transaction registered and I will now pass on to a description of the counters *per se*. As said counters are all alike the description of one will suffice for all. As has before been explained the counter which is to receive the registration is first rocked forward into engagement with its counter driving gears while said driving gears are yet in normal position. They are held thus in engagement while said gears make their movements in one direction. In the present instance the engagement is during the initial or downward movement of said gears. Just before the return movement of said gears is begun the counter is restored to normal disengaged position. The counter wheels 174 are journaled upon a shaft 175 which is mounted in the upper portion of the counter frame 126, (see Fig. 14). This shaft 175 is provided at one end with a ratchet wheel 176 and an operating wheel 177 (see Fig. 32). The ratchet wheel is fast to the shaft while the wheel 177 is loose thereon but is provided with a spring pressed plunger pawl 178 which engages the ratchet wheel. The wheel 177 is rotated by any suitable instrument inserted in an aperture 179 formed therein, and by this means the shaft 175 may be rotated to turn the counter wheels to zero by rocking the wheel 177 back and forth. Said shaft is formed with a longitudinal groove 179ᵃ (see Fig. 14) in which spring pressed pawls 180 pivoted on the counter wheels are adapted to catch when the shaft is turned rearward, to turn all the wheels to zero. Each of the counter wheels is also provided with a ratchet wheel 181 and a transfer lug 182 while the first five counter wheels beginning at the right hand end are provided in addition each with a pinion 183; said pinions being adapted to be engaged by the counter driving gears as heretofore described. Impressed upon the peripheries of said counter wheels are numerals consisting of the digits from zero to nine.

When one of the counter wheels has made a complete revolution, which equals one unit of the wheel of next higher denomination, its transfer lug 182 contacts with one of a series of pivoted latch arms 184 and moves the same against the tension of its spring 185 which normally forces it downward thus disengaging a nose 186 formed thereon from a pin 187 which is mounted upon one of a series of levers 188. The levers 188 which are of bell crank formation are journaled upon a shaft 192 mounted in the counter frame and their coil springs 193 which are interposed between them and portions of the counter frame tend normally to rock them forward. The pins 187 coöperating with their latch arms 184 prevent this. Thus when one of the latches 184 is tripped as before described by its transfer lug 182, the lever 188 is thrown forward by its spring so that the incline edge 194 of the nose of the latch will rest upon the pin 187. A spring pressed transfer pawl 195 is pivoted to the upper end of each transfer lever 188 so as to coöperate with its respective ratchet wheel 181 to move the same forward one notch when the lever 188 is restored to normal position. Movement is imparted to the respective transfer levers to effect the transfer by incline lugs, 196 mounted upon a sleeve 197 fast to the rotation shaft 26ᵈ (see Figs. 8 and 22). These lugs are so arranged upon their respective sleeves as to engage noses 198 formed on the respective transfer levers 188 and thus force them rearward after they have been tripped forward and downward as above described. The lugs are also arranged in successive order of rotation so that the levers are operated successively and thus will not interfere with a transfer made necessary by a transfer preceding it during the same operation. The counter wheels are held against accidental displacement, misalinement, and backward movement by a series of retaining pawls 202 which are pivoted upon the shaft 192 and are forced into engagement with the ratchets 181 by coil springs 203 interposed between said pawls and the counter frame. A yoke 201 is suitably pivoted upon the counter frame and is formed at one end with a notch or recess 206 and an arm 207; the latter being engaged and forced upward by a coil spring 208 suitably mounted upon the counter frame, (see Fig. 15). A lever 209 is pivotally mounted upon the counter frame so that one of its ends projects into the notch 206, while the opposite forked end is formed with two spaced noses 210 and 211 which coöperate with a cam 212 fast to the shaft 175. When in normal position as shown in Fig. 15 the nose 210 rests in a notch 213 formed on the cam 212. When it is desired to turn the counter to zero the wheel 177 is rocked as before described which action rotates the shaft 175 so that it will pick up and turn the respective counter wheels to zero. The same movement also rotates the cam 212 so as to actuate the lever 209 near the end of the operation. The movement of the lever 209 causes the yoke 201 to be swung backward whereby any of the transfer levers 188 which have been released by the rotation of the counter wheels in turning to zero will be returned to normal position so as to destroy the transfer which would otherwise subsequently occur. Near the end of the operation of turning to zero the nose 210 is forced upward by the cam 212 to such an extent as to bring the nose 211 in the path of a shoulder 214 formed on said cam and thus form a positive stop when the zero point is reached. When turning to zero the momentum of the wheel 177 carries the notch 213 slightly by the nose 210 and thus causes the nose 211 to engage the shoulder 214. After the operation is complete and pressure upon the shaft 175 is relaxed the nose 210 settles back fairly into the notch 213 and thus disengages the nose 211 from the shoulder 214.

In the modified form of counter shown in Figs. 23, 24 and 25 the counter wheels, yoke 201 and coacting devices are substantially the same, as heretofore described with the exception that the arm 207 of the yoke is omitted and the spring 208 mounted so as to bear directly against the lever 209. The shaft 175 though for turning the counter wheels to zero receives motion from a bevel pinion 216 mounted on one end thereof and meshing with a similar pinion 217 suitably journaled on the counter frame. This latter pinion is formed with a groove 218 for the reception of a suitable key for rotating it. In this modified form of counter when one of the counter wheels has made a complete revolution its lug 182 contacts with one of a series of latch arms 219 and moves the same against the tension of its spring 220 to disengage a nose 221 formed thereon from a spring pressed stop pawl 222. This stop pawl is pivotally mounted upon its respective transfer lever 188 and is forced normally forward by a coil spring 223 interposed between it and a stud 224 mounted on said lever. The pivotal movement of the stop is limited by a nose 225 formed on said stop and adapted to abut against the stud 224. Should one of the latches 219 be very rapidly operated by the rapid rotation of the counter wheel, there would be danger of the lever 188 moving too slowly to cause the stop pawl 222 to disengage from the latch but as the stop also moves independently rearward upon the operation of the latch this danger is avoided as a small moving part like the stop will move quite as fast as the latch. The transfer pawls 226 of this modified form are pivoted to the respective transfer levers 188 and each of the same extends forwardly as shown in Figs. 23 and 24 and is formed with a downwardly inclined nose 227. When one of the levers 188 is operated to effect a transfer the nose 227 contacts with the yoke 201 as the pawl moves forward and up at its operating end and thus holds the said forward end of the pawl into engagement with the teeth of the ratchet wheel 181 and to prevent any overthrow of the wheel by the pawl riding over the teeth should the wheel be thrown violently forward.

The cash drawer 229 is mounted in the main frame of the machine and is provided with any suitable spring opening means whereby when released it is forced into an open position. The drawer is held closed against this spring tension by a bell crank latch 230 (see Fig. 6), which is so pivoted upon the main frame that a nose 231 formed on its lower end engages a latch plate 232 mounted on the drawer. The lever is normally held in this latching position by a coil spring 233 mounted in a socket formed in a portion of the frame and bearing against said lever. A cam mounted upon the shaft 78 coöperates with the upper end of the lever 230 for operating the same against the tension of its spring to release the drawer. The said shaft 78 further carries a cam 235 (see Figs. 10 and 31), which coöperates with a nose 236 formed on a pivoted lever 237; said nose being held to contact with said cam by a coil spring 238 which connects said lever to the frame. The lever 237 carries a striker 239 so that when it is operated by the cam against the tension of its spring and then suddenly released, said striker will sound a bell 240 mounted on the main frame.

As the greater part of the work of the machine occurs near the last half of the stroke of the operating handle, I equalize this uneven distribution of the requisite operating power by providing the rock shaft 56 with a pendent rigid arm 241, (see Fig. 6) which is connected to a coil spring 242 fast to the main frame. During the first movement of the shaft 56 in a forward direction this spring is put under tension by the arm 241 moving forward so that upon the return movement in an opposite direction the tension of the spring will assist. The rotation shaft $26^d$ carries an arresting ratchet wheel 243 which is engaged by a spring pressed pawl 244 mounted on the frame whereby all backward rotation of the operating handle is prevented (see Figs. 8 and 33).

All of the rotation shafts before mentioned are suitably geared together and to the shaft 245 of the operating crank (see Fig. 7), and as this gearing comprises intermeshing gear wheels of the usual construction no detail description of the same is deemed necessary. The operating handle 6 is provided with any suitable form of movable stop $6^a$ (see Fig. 1) which normally contacts with a stationary stud $6^b$ mounted on the frame to arrest the handle at the proper point.

It will be seen by reference to Fig. 4 that the operating segment 123ª of the clerk's initial bank which is operated substantially in the same manner as the other banks is located to the left of the fourth or special counter out of the path of any of the gears of said counter in a similar manner to the segment 122ª. Each of the segmental gears 122, 122ª, and 123ª which represent respectively the seven banks of keys meshes with one of a series of pinions 247, which pinions are mounted respectively upon a transverse shaft 248 and a series of nested sleeves 249 applied over said shaft, as shown in Figs. 6, 10, and 30. The outer ends of the sleeves 249 and the shaft 248 are provided with printing wheels 250 so that upon the movement of the aforesaid segments said wheels will be moved to a corresponding degree to bring the correct printing types into printing position. These printing wheels coöperate with any suitable printing mechanism but I prefer to use the construction illustrated which is substantially the same as that described in my Patent No. 587,702 dated Aug. 10th, 1897, and I will therefore refer to the same for a detail description of the mechanism which forms no part of my present invention. One exception to the above statement is the mechanism for adjusting the check feeding roller so that a check will be issued or not as desired. This mechanism comprises primarily a check key 251 suitably mounted and guided in the main frame and provided with a laterally projecting pin 252 (see Fig. 4) which pin rests upon a crank pin 253 mounted on a crank arm 254. This arm is fast to a rearwardly extending rock shaft 255 see Figs. 7 and 12. The said rock shaft is further provided at its rear end with a crank 256 carrying a crank pin 257 which latter projects into a vertical groove 258 formed in an arm 259 fast to a shaft 260 for which see Fig. 5. Said shaft 260 is capable of longitudinal movement but is normally held in the position shown in Fig. 12 by a coil spring 261 mounted thereon between the frame and a stop arm 262 fast to said shaft. It will be observed from the above that when the shaft 255 is rocked by the operation of the check key the shaft 260 is slid longitudinally against the tension of its spring 261. The end of the shaft 260 is formed with an annular groove 263 into which projects a pin 264 fast to a sleeve 265 which is loosely mounted upon the end of said shaft. This sleeve is connected to said shaft by a coil spring 266 secured to said sleeve and to a collar 267 fast to the shaft. Said sleeve is provided with an arm 268 having a yoke 268ª formed on its end. The arms of this yoke extend into an annular groove 269 formed in a clutch member 270. This clutch member is adapted to operate in substantially the same manner as described in said patent to throw the check strip feeding roller and check platen into and out of operative condition. The sleeve 265 is further provided with an independently movable stem 271 having a thumb knob 272 formed on its outer end whereby said sleeve may be rocked independently of its operation through the shaft 260. The stem 271 projects into the sleeve and is connected to it in the same manner as the shaft 260. When the sleeve is moved longitudinally either by the shaft 260 or its knob 272 the clutch 270 is brought into operative position and one arm of the yoke 268ª which has been resting upon a collar 273 descends under the impetus of the spring 266 and becomes locked against return by the end of said collar (see Fig. 13). This collar is fast upon a rotation shaft 274 which latter also carries a cam lug 275 adapted to engage the locking arm of the yoke and lift the same to permit the yoke to move laterally and return to normal position under the impulse of the spring 261.

It will be observed from the above description that if the check key is depressed a check is issued but the devices are returned to normal position after the printing of the check and no check will be issued during the succeeding operation unless the check key be again depressed. As it is sometimes desired to issue checks continuously without operating the check key each time, the stem 271 is provided with a segmental flange 276 extending partly about the same and adapted to be turned under a headed bolt 277 mounted on the frame, to hold the stem and sleeve 265 in their inner positions. When the shaft 260 is in normal position the aforesaid stop arm 262 is in alinement with the lower portion of the check platen lever 278 and thus locks the same but when said shaft is moved longitudinally the arm is moved out of alinement with the said lever and thus leaves the same free to operate.

It will be observed from the aforegoing description that the machine is made in duplicate section which are similar in construction and operation and the size or capacity of said machine may therefore be increased or diminished as desired by simply adding or omitting the requisite number of sections.

Having thus described my invention what I claim as new and desire to secure by Letters Patent is:

1. In a cash register, the combination with a series of keys of a driving member arranged to make a definite and constant excursion at each operation of the machine, a driven member arranged to be immediately coupled to the said driving member upon the operation of any one of said keys, counter operating devices arranged to be actuated from the driven member, a counter alternately connected with and disconnected from said operating devices, and means, when the machine is operated, for moving the driven member forward during the first half of the stroke of the driving member and until it is uncoupled from the driving member by the operated key.

2. In a cash register, the combination with a crank or other actuating means, of a driving member which is given a constant excursion at each operation of the machine; a driven member normally uncoupled from the driving member; manipulative means for coupling the driving and driven members together so that the driven member will first move with the driving member during the initial movement of the latter, said manipulative means then effecting the uncoupling of the driving and driven members at different points in their forward stroke; and means for again coupling the driving and driven members during the same operation of the machine and whereby the driven member is returned to normal position.

3. In a cash register, the combination with the counter, an indicator and a crank, of a driving member arranged to be given a constant and definite excursion by the actuating means at each operation of the machine, a driven member, a series of keys arranged to uncouple said members operating means for the indicator and means for connecting said indicator operating means with and disconnecting it from the driven member.

4. In a cash register, the combination with a counter, of a series of keys, an indicator, a driving member, a driven member arranged to be coupled with and uncoupled from the driving member, indicator operating mechanism arranged to be coupled to the driven member and means for disconnecting said mechanism from the driven member to allow the indicator to move independently of the same.

5. In a cash register, the combination with the counter, the indicator, a series of keys and an actuating means, of a driving member, a driven member arranged to be moved by the driving member, indicator operating means arranged to be engaged with the driven member after the indicator has been returned to zero position, means for turning the indicator to zero counter actuating means in constant engagement with the driven member; and means for alternately establishing and disconnecting an operative relation between the counter and the said counter operating means.

6. In a cash register, the combination with the indicator, a series of keys and an actuating means, of a driven member arranged to have a variable movement according to the value of the operated keys means for returning the indicator to zero position during the initial movement of the actuating means and independently of the driven member, and independent means arranged to be thereafter engaged with the said member for moving the indicator to position to display the value of the operated key as said member is returned to normal position.

7. In a cash register, the combination with an indicator and a series of keys, of a driven member, which is arranged to make a variable excursion according to the operated key, a crank or other actuating means, connecting devices independent of the driven member intermediate the actuating means and the indicator for restoring the latter to zero position during the initial movement of said driven member, and indicator actuating devices in permanent engagement with the indicator and arranged to be actuated by the said driven member during the return movement of the latter for adjusting the indicator into position to display the value of the operated key.

8. In a cash register, the combination with a series of keys, of a crank or other actuating means, an indicator, a driven member, which is arranged to be given a variable excursion according to the value of the operated key, indicator actuating devices arranged to be alternately brought into and disconnected from operative connection with the said driven member, counter driving gear or devices in constant operative connection with the said driven member, and a counter which is arranged to be alternately brought into and disconnected from operative engagement with said counter operating devices.

9. In a cash register, the combination with a series of keys, an indicator, and an actuating means, of a driving member arranged to make a constant excursion, a driven member arranged to be coupled with the driving member and to make a variable excursion according to the operating key, operating devices for the indicator which are alternately brought into and disconnected from operative connection with the driven member, and counter actuating devices in constant engagement with the driven member and a counter arranged to be alternately brought into and disconnected from operative connection with the said devices.

10. In a cash register, the combination with an indicator, a counter and a series of keys, of a driving member, a driven member, means for uncoupling said members at different points according to the operated key, and means for returning the driven member to normal position during the same operation of the machine and thus setting the indicator.

11. In a cash register, the combination with a counter and a series of keys, and an indicator of a driving member, a driven member normally uncoupled therefrom, means for coupling said members by the operation of a key, means for uncoupling said members during the movement of the actuating means and according to the value of the operated key, and means for subsequently returning the driving and driven members to normal position during the same operation of the machine and thus setting the indicator.

12. In a cash register, the combination with the actuating means, an indicator, and a driven member, of indicator actuating devices comprising means for turning said indicator to zero position and a latch arranged to engage and momentarily lock said means just as the said indicator is brought to said zero position, and thus prevent rebound of said indicator actuating devices.

13. In a cash register, the combination with a series of keys, of a driving member, a driven member adapted to be coupled to the first mentioned member and to be uncoupled and stopped by an operated key, and independent means arranged to be set upon the operation of the keys for locking the driven member in the position in which it is stopped by the operated key.

14. In a cash register, the combination with a series of keys, of a driving member, a driven member adapted to be coupled to the first mentioned member and to be uncoupled therefrom by an operated key, a detent for the keys and means connected to the detent and adapted to lock the driven member in any position in which it is stopped.

15. In a cash register, the combination with operating devices, of a counter comprising a series of counter wheels, a series of transfer pawls, and a normally stationary member arranged to be engaged by the said pawls when the same are moved to transfer to prevent them from disengaging from the counter wheels and thus allowing overthrow and means for moving said member to reset the transfer pawls.

16. In a cash register, the combination with operating devices, of a counter comprising a series of counter wheels, a shaft for returning said wheels to zero, a cam mounted upon said shaft and having a notch and a shoulder and a spring pressed lever having two rigid arms arranged to coact with said notch and shoulder to arrest the shaft at the zero point but immediately release it when the pressure upon it is removed the construction being such that when one arm is projected into the notch the other will be positively moved out of engagement with the shoulder.

17. In a cash register, the combination with operating devices, of an indicator, a rack bar for operating said indicator, means for positively connecting the rack bar and operating devices to move said rack bar in one direction and independent operating means for moving the rack bar positively in an opposite direction to return it to normal position.

18. In a cash register, the combination with a series of keys, of a positively movable driving member, a driven member adapted to be coupled to the first mentioned member and to be uncoupled by an operated key, a detent for the keys and a toothed device connected to the detent and arranged to lock the driven member in any position in which it is uncoupled.

19. In a cash register, the combination with a series of keys, of a positively movable driving member, a driven member, a coupling device between the two members, and means, independent of the keys but set by the operation of the same for locking both the coupling device and the driven member.

20. In a cash register, the combination with a main operating gear, of a pivoted lever having a gear and arranged to be rocked into and out of mesh with the first mentioned gear and to receive its movement therefrom, an indicator, and means connecting the indicator and lever.

21. In a cash register, the combination with operating devices, of a plurality of independent counters, devices for shifting said counters into connection with the operating devices, independent laterally slidable bars for setting said devices for operation by the regular movement of the machine, a series of special keys one for each bar for operating the same and connecting means between the keys and the respective bars whereby a depression of a key will move its bar laterally.

22. In a cash register, the combination with counter operating devices, of a cash counter, a series of independent special counters; shifting devices for said counters for causing their operation; a series of independent laterally slidable bars, each of said bars being formed with notches the walls of which notches engage elements for disabling the cash counter shifting device and enabling the shifting device of the proper special counter; and manipulative means for controlling the operation of said bars.

23. In a cash register, the combination with operating devices, of a plurality of independent counters, shifting devices for said counters independent shifting bars for setting said devices for operation, independent shifting arms for said bars, a series of special keys and devices connecting said keys and shifting arms.

24. In a cash register, the combination with operating devices, of a plurality of independent counters, cams for throwing said counters into operative position, arms mounted on the counters and arranged to be operated by said cams, independent shifting bars for the respective arms and a series of keys for operating said bars.

25. In a cash register, the combination with operating devices, of a plurality of independent counters, independent shifting bars for setting said counters, keys for operating said bars, and devices for locking all of said bars from movement after the operation of the machine has commenced.

26. In a cash register, the combination with a driving member, of a driven member, a registering or clutch lever mounted on said driven member and arranged to engage the driving member, a series of keys adapted to coact with said lever, a detent for the keys, and means connected to the detent and adapted to lock both the clutch lever and the driven member.

27. In a cash register, the combination with an operating gear, an indicator, a rocking link or bar for operating said indicator, and a latch adapted to engage said link to prevent rebound and to be disengaged therefrom when said link is rocked.

28. In a cash register, the combination with a series of keys arranged in banks, of detents for the respective banks, latches for the detents, a release device for the keys arranged to operate said latches independently of the operation of the machine, and a locking device for locking the machine while the release device is being operated.

29. In a cash register, the combination with operating devices, of a counter comprising a series of counter wheels, a series of transfer levers, spring pressed stop pawls mounted on said levers for normally holding the same stationary, transfer pawls also mounted on said levers, a series of latches mounted independently of the levers and engaging said stop, pawl devices for actuating the operating levers and means for tripping the latches.

30. In a cash register, the combination with operating devices, of a counter comprising a series of counter wheels, a series of transfer levers, transfer pawls mounted on said levers and an independently movable member adapted to engage the transfer pawls and prevent overthrow and also to reset said pawls when tripped by the operation of turning to zero.

31. In a cash register, the combination with a series of keys, of a detent for the same, a pivoted lever connected to said detent, a latch for said lever, actuating devices for operating the register, a lock for said devices which is released by said lever, a release key, for releasing said latch, independently of the regular operation of the machine.

32. In a cash register, the combination with the actuating means, of a counter comprising a series of counter wheels, a series of pivoted transfer levers, a series of stop pawls mounted on said levers for normally holding the same stationary, a series of transfer pawls also mounted on said levers, and a series of latches mounted independently of the levers and engaging the stop pawls and adapted to be tripped by the counter wheels.

33. In a cash register the combination with a series of keys arranged in banks, of a detent for each bank, a series of latches for holding the detents, a bar arranged to trip said latches, means for moving said bar upon the operation of the machine, and means for moving said bar independently of the operation of the machine.

34. In a cash register, the combination with a series of keys arranged in banks, of a detent for each bank, a series of latches for holding the detents, a bar having a series of projections arranged to trip their respective latches, and means for reciprocating said bar once during each operation of the machine.

35. In a cash register, the combination with an operating gear, an indicator, indicator actuating gear arranged to be thrown into mesh with the operating gear when the latter is moving in one direction, to set the indicator, and out of such mesh when it is moving in an opposite direction, and an independent gear for returning the indicator to zero.

36. In a cash register, the combination with counter actuating devices, of a cash counter, a series of special counters, pivoted shifting arms mounted on said counters, pins carried by said arms, and independent slidable bars coöperating respectively with the pins of the special counters, and all coöperating with the pin of the cash counter.

37. In a cash register, the combination with actuating devices, of a series of independent counters, pivoted shifting arms mounted on said counters, and provided with operating projections, independent shifting bars engaging the respective pins, an additional counter, and a shifting arm mounted thereon and arranged to be operated by any one of the said bars.

38. In a cash register, the combination with operating devices, of a plurality of counters, a series of cams having locking grooves, projections mounted on the frames of the counters and arranged to enter said grooves to lock the counters in position, movable arms mounted on said counters and arranged to engage said cams and a series of independent shifting bars for moving said arms.

39. In a cash register, the combination with a series of keys, of a driven member adapted to be given different movements according to the key operated, a gear arranged to be moved into and out of mesh with said driven member, a rack bar connected to said gear and an indicator arranged to be operated by said rack bar.

40. In a cash register, the combination with a series of keys, of a driving member having a shoulder formed thereon, a driven member, a lever pivoted on said latter member so as to engage said shoulder and to be disengaged therefrom by striking an operated key a pin on said lever, and a lever having a recess adapted to receive and hold the said pin and means connecting said lever with the keys.

41. In a cash register, the combination with a series of keys, of a driving member, a driven member, a clutch lever pivoted on the latter and adapted to engage the driving member and to be disengaged therefrom by an operated key, a gear on the driven member, a series of duplicate counter driving gears operated by said gear first mentioned, and a plurality of counters arranged to be thrown at will into connection with the respective counter driving gears.

42. In a cash register, the combination with a series of keys arranged in banks, a detent for each bank, a pivoted lever connected to each detent, independent operating devices for each bank arranged to be locked by said levers respectively, independent latches for said levers for holding them in position as they are respectively operated, and means for operating said latches to release the levers upon the movement of the machine.

43. In a cash register, the combination with a driven member, of an indicator, a rack bar for said indicator, a pivoted lever connecting said member and rack-bar to move the latter in one direction only and an independent gear engaging said rack bar to move the same in the opposite direction.

44. In a cash register, the combination with the actuating means, of an indicator, a slidable rack bar for operating said indicator, an operating link pivoted to said bar, means connecting said link to the actuating means so as to both reciprocate and rock it at each operation of the machine, and a latch arranged to coöperate with the link for preventing rebound of the rack bar.

45. In a cash register, the combination with actuating means, of an indicator carrying a pinion, a slidable rack bar meshing with said pinion, means connecting said rack-bar with the actuating means, devices for moving it in one direction and independent means engaging rack teeth of said bar to move the latter in the opposite direction.

46. In a cash register, the combination with a driving member having a shoulder, of a driven member, a pivoted clutch lever mounted on the latter member and having a hook arranged to engage the first mentioned member, a series of keys for operating said lever to rock it and disengage the hook, operating devices connected to the driven member, a counter coöperating with the said devices, and a projection on the driving member adapted to engage the shoulder on the driven member to return the latter to normal position.

47. In a cash register, the combination with a driving member, of a driven member, a spring pressed clutch lever mounted on said latter member, a series of keys arranged to coöperate with said lever, a pin on said lever, and a locking lever actuated by the keys and arranged to engage said pin to lock said lever in its different positions.

48. In a cash register, the combination with a series of keys arranged in banks, of a detent for each series, latches for holding the detents in their depressed positions, a slidable bar formed with a slot and arranged to operate said latches, a detent lever one end of which projects into said slot, and means for operating said lever upon the operation of the machine.

49. In a cash register the combination with a series of keys arranged in banks, of a detent for each series, a lever connected to each detent, a latch engaging each lever, a slidable bar arranged to operate said latches, and formed with a slot, a pivoted lever one end of which engages said slot, and a cam or pin such as 26$^e$ which is arranged to be moved into the path of said lever for actuating the latter to release the keys.

50. In a cash register the combination with a series of keys, of detents for the same, latches for said detents, a slidable bar arranged to release said latches, a locking device for the machine arranged to be operated by said bar, a release key for moving said bar, and means for locking the machine when the release key is operated.

51. In a cash register the combination with a series of keys, of detents for the same, latches for said detents, devices for operating said latches, locking means for the machine connected to said latch operating devices, a release device for actuating the latch operating devices, and independent locking means for the machine arranged to be operated by the release device.

52. In a cash register the combination with an operating mechanism, of printing devices arranged to print a check, a check key for adjusting the printing devices to operative position for one operation of the machine only and then allowing them to automatically return to normal inoperative position, and means independent of the check key for adjusting the printing devices so that they will operate continuously.

53. In a cash register the combination with an operating mechanism, of printing devices arranged to print a check and comprising normally inoperative feeding devices, a key for throwing the latter into operative position for one operation of the machine only, and independent means for setting said feeding devices to cause a continuous operation of said printing devices.

54. In a cash register the combination with an actuating mechanism, of printing devices arranged to print a check, a clutch for throwing the printing devices into and out of operative position, a key for moving said clutch but allowing it to return to normal position after each operation of the printer and means independent of said key for operating said clutch and holding it to its work for a succession of printing operations.

55. In a cash register the combination with an actuating mechanism, of printing devices arranged to print a check, a clutch for throwing the printing devices into and out of operative position and arranged to return to normal inoperative position after each operation of the printer, a key for throwing said clutch, and a finger piece also for throwing said clutch and adapted to be latched in the position to which it is turned to hold the clutch to continuous operation.

56. In a cash register the combination with an operating gear, of a rock arm, a lever supported on said arm and having a gear arranged to be alternately brought into connection with and disconnected from the operating gear as the arm is rocked, means connected to the movable parts of the machine for rocking the arm, a rack-bar connected to the pivoted lever and an indicator arranged to be operated by said bar.

57. In a cash register the combination with a series of keys, of a detent for the same, a lever connected to said detent and having a toothed arm and a locking arm, a driving member, a driven member having a locking shoulder arranged to coact with said locking arm and a pivoted clutch mounted on said driven member and arranged to coact with and lock against the toothed arm.

58. In a cash register the combination with a series of keys of locking detents therefor, latches for said detents, a lever for unlocking the machine arranged to operate said latches, a release key, and a lever operating by said key and arranged to operate the first mentioned lever and to simultaneously lock the machine.

59. In a cash register, the combination with a counter operating mechanism, of a counter comprising a series of counter wheels; a turn-to-zero shaft; a ratchet wheel mounted on said shaft; an apertured disk loose upon said shaft and arranged to receive a tool for rotating the same; and a pawl mounted in said disk and engaging said ratchet wheel whereby said wheel and its shaft will be turned when said disk is oscillated by said tool.

60. In a cash register the combination with counter operating devices, of a series of pivoted counter carrying frames, movable shifting arms mounted on said frames, and a series of cams each comprising a disk having a locking groove extending about a portion of the same and a cam projection extending about the remaining portion.

61. In a cash register the combination with a registering mechanism, of a printing device connected thereto, check feeding means, a clutch connecting said means to the movable parts of the machine, a thumb nut for operating said clutch, a rock shaft also adapted to operate said clutch, a crank arm mounted on said shaft and a key for operating said crank arm.

62. In a cash register the combination with counter operating devices, of a counter comprising a series of counter wheels, a turn-to-zero shaft for supporting the same, transfer levers, transfer pawls on said levers, latches for holding the levers in inoperative positions arranged to be tripped by the counter wheels, a pivoted member for moving the levers to inoperative position, and means for operating the pivoted member from the turn-to-zero shaft.

63. In a cash register the combination with a series of keys, of latching devices for the same, a pivoted lever for tripping said devices formed with a cam groove a locking hook and a pin mounted on a movable part of the machine and arranged to operate in said cam groove and means connecting the pivoted lever and latching devices.

64. In a cash register the combination with a series of keys, of latching devices for the same, a pivoted lever for tripping said devices formed with a cam groove, and a pin mounted on a movable part of the machine and arranged to operate in said cam groove and means connecting the pivoted lever and latching devices.

65. In a cash register the combination with a series of keys, of detents for the same, latches for the detents, a bar for operating said latches, a lever arranged to operate said bar and having an operating cam groove formed therein for preventing overthrow and an operating disk having a pin arranged to operate in the said cam groove.

66. In a cash register the combination with a driving member comprising a partial gear having a locking shoulder and an operating shoulder, of a driven member having a pin arranged to be engaged by the operating shoulder, and a clutch arranged to engage the locking shoulder keys for tripping said clutch and an operating gear meshing with said partial gear for imparting movement to the same.

67. In a cash register the combination with counter operating devices of a rack bar connected thereto, an indicator arranged to be operated by said bar and a latch for automatically engaging said bar when it reaches its extremity of movement to prevent rebound.

68. In a cash register the combination with a series of keys, of a driving member, a driven member, a coupling lever mounted on one of said members and adapted to engage the other, a locking pin mounted on said lever, a detent for the keys and a lever connected to the detent, and having an arm formed with teeth with which the said pin locks.

69. In a cash register the combination with counter operating devices, of a counter comprising a series of counter wheels, a series of pivoted transfer levers, transfer pawls mounted on said levers, turn to zero devices and a pivoted yoke operated by the turn to zero devices to reset the pivoted levers and also to act as a stop for the transfer pawls to prevent overthrow.

70. In a cash register the combination with counter operating devices, of a counter comprising a series of number wheels, transfer pawls, means for operating said pawls, and a pivoted yoke arranged to remain relatively stationary when said pawls are operated so as to be engaged by the pawls to cause the latter to become locked temporarily to the counter wheels.

71. In a cash register the combination with the actuating means of a series of independent counter supporting frames, arms having locking projections and mounted on said frames, counter frame operating cams having locking grooves with portions of their walls reduced so that the locking projections may pass into and out of said grooves to lock or free the frames according to the positions of the cams.

72. In a cash register, the combination with operating devices, of a series of independent counter supporting frames, pivoted arms mounted on said frames, grooved cams arranged to engage said arms and thus shift the frames, and pins mounted on said frames and arranged to be engaged by the cams and forced into the grooves of the same.

73. In a cash register the combination with a series of keys, of a positively movable driving member, a driven member adapted to be coupled to the driving member and to be uncoupled by an operated key, a movable member common to the keys, and a toothed device connected to said member and adapted to lock the driven member in any position in which it is uncoupled.

74. In a cash register, the combination with a series of keys, of locking detents for the same, levers operated by said detents, latches for said levers, a bar for operating said latches and means connecting said bar to the movable parts of the machine whereby it is operated near the end of the operation of the machine.

75. In a cash register, the combination with a series of keys, of locking detents therefor, levers operated by said detents, latches for said levers, a bar for operating said latches and a release key for operating said bar.

76. In a cash register the combination with a series of keys, of the actuating means coöperating therewith, and a release key for the first mentioned keys arranged to lock the machine while being operated.

77. In a cash register the combination with a series of keys, of the actuating means, coöperating therewith, detents for holding the keys in their depressed positions, a key for releasing said detents and devices for locking the machine against operation while the release key is being operated.

78. In a cash register, the combination with a series of keys, of the actuating means coöperating therewith, a series of independently movable frames carrying counters, shifting arms pivoted on said frames, a series of shifting bars connected to the respective arms, independent rock shafts for operating said bars, and keys for operating said shafts.

79. In a cash register the combination with a series of keys, of the actuating means, a series of independently movable frames carrying counter shifting arms pivoted on said frames, shifting devices coöperating with said arms, a series of bars for adjusting said arms, means connecting the arms and bars whereby the movement of any one of the bars will throw one of the arms out of operative position and another into operative position, and means for operating said bars.

80. In a cash register the combination with a series of keys, of the actuating means, a series of independently movable frames each carrying a counter, a movable shifting arm on each frame, cams adapted to engage said arms and also arranged to lock the counter frames, a series of shifting bars one for each of said arms, and a series of keys arranged to operate said bars.

81. In a cash register the combination with a series of keys, of counter operating devices coöperating therewith, a series of independently movable frames each carrying a counter, a movable shifting arm on each frame, shifting devices arranged to engage said arms, a series of movable bars one for each of said arms, and keys connected to the respective bars for operating them.

82. In a cash register, the combination with a series of keys, of counter operating means coöperating therewith, a counter mounted on a movable frame, a shifting arm mounted on said frame, a rigid locking arm also mounted on said frame, a cam formed with a locking groove and adapted to engage and operate the shifting arm, and a projection on the locking arm adapted to enter the locking groove.

83. In a cash register, the combination with a driving member, of a driven member having an initial and a return movement and arranged to be coupled thereto and uncoupled therefrom, a series of keys for arresting the driven member, an indicator and means for operating the indicator arranged to be disconnected from the driven member during its initial movement and connected thereto during its return movement.

84. In a cash register, the combination with a driving member, of a driven member arranged to be coupled with and uncoupled from the same, an indicator, indicator operating mechanism arranged to be coupled to the driven member, means for disconnecting said mechanism from the driven member, and devices for returning the indicator to zero when the mechanism is so disengaged.

85. In a cash register, the combination with a driving member, of a driven member arranged to be coupled with and uncoupled from the same, an indicator, indicator operating mechanism arranged to be coupled to the driven member and means for disconnecting said mechanism from the driven member to allow the indicator to move independently of the same.

86. In a cash register, the combination with an indicator, of a series of keys, a driving member, a driven member, means for uncoupling said members upon their forward strokes and at different points according to the value of the operated key and again coupling them at the same point in the back stroke, and means for connecting the indicator to the driven member upon the back stroke of said member whereby said indicator is set upon said backward movement.

87. In a cash register, the combination with a series of keys, of a gear member having a forward and backward movement and arranged to be arrested in its forward movement by the operated key, an indicator, normally out of connection with said gear and means for connecting the indicator to the gear upon the backward movement of the latter.

88. In a cash register, the combination with an indicator, of a series of keys, a driving member, a driven member, means for uncoupling said members upon their forward strokes, at different points according to the value of the operated key and means for coupling the indicator to the driven member upon the back stroke of said member whereby said indicator is set.

89. In a cash register, the combination with a series of keys, of a driving member arranged to have a definite movement at each operation of the machine, a driven member arranged to be moved forward by the driving member during the first half of its stroke and back to normal position during the last half of its stroke, being arrested in its forward movement by the operated key, and an indicator arranged to be moved with the driven member during its return movement but be free of the same during the forward movement of said member.

90. In a cash register, the combination with operating devices, of a counter comprising a series of counter wheels, a series of transfer levers, stop pawls mounted on said levers, transfer pawls also mounted on said levers, latching devices engaging the stops for normally holding the transfer levers out of operative position and means for tripping said latching devices.

91. In a cash register, the combination with an operating element, and means for giving the same a compound movement, of an automatic latch engaging said element between the divided portions of such compound movement to prevent rebound of said element and remaining in engaging position until further movement of said element.

92. In a cash register the combination with an oscillatory actuating member, of an indicator, and a pivoted lever mounted upon a movable support, means connecting said lever and said indicator, and means for moving said support to connect the actuating member with said lever and thereby set the indicator by the pivotal movement of the lever.

93. In a cash register the combination with a driving member, of an indicator, a pivoted lever mounted on a rocking support so that it may be moved into and out of connection with the driving member, and means connecting said lever to the indicator to set the latter by the pivotal movement of the lever.

94. In a cash register the combination with a driving member, of a driven member arranged to be coupled thereto and uncoupled therefrom, a series of keys for arresting the driven member, an indicator, and means connected to the indicator and arranged to be connected to and disconnected from the driven member according to its direction of movement.

95. In a cash register the combination with a driving member, of a driven member arranged to be coupled to and uncoupled from said driving member, an indicator, indicator operating mechanism constructed to be coupled to and uncoupled from the driven member, and means for actuating the said indicator operating mechanism when it is disconnected from the driven member.

96. In a cash register the combination with a driving member, of a driven member arranged to be coupled to and uncoupled from the driving member, an indicator, an indicator setting device constructed to be thrown into and out of engagement with the driven member, and means independent of the driven member for returning the indicator setting device to its normal position.

97. In a cash register the combination with a driving member, of a driven member arranged to be coupled to and uncoupled from the said driving member, an indicator, an indicator actuating rack and connections constructed to be coupled to and uncoupled from the driven member, and gearing for returning the indicator operating rack to its normal position.

98. In a cash register, the combination with an indicator, of a counter, a series of keys, a driving member, a driven member, means for coupling and uncoupling said members, a connecting device for returning the driven member to normal position during each operation of the machine, and means for setting the indicator upon the return of the driven member.

99. In a cash register, the combination with a movable element having a locking projection, of a pivoted member having a hook against which said projection strikes and formed with a groove through which said projection passes to lock the member to the said projection, and means for operating said pivoted member.

100. In a cash register, the combination with a counter, of a series of controlling keys, an indicator, an operating mechanism, a driving member arranged to be given a definite movement by the operating mechanism, a driven member, coupling devices for the members controlled by the keys, operating means for the indicator, and means for connecting and disconnecting said operating means and the driven member.

101. In a cash register, the combination with a driving member, of a series of controlling devices, a driven member constructed to be given different movements according to the setting of the controlling devices, a gear arranged to be moved into and out of connection with the driven member, an indicator, and indicator actuating means connected to said gear.

102. In a cash register, the combination with an operating mechanism, of printing devices, a special key for adjusting the printing devices to operate in connection with the operating mechanism, means for automatically returning the parts to their normal positions upon each operation of the machine, and an independent means for adjusting the printing mechanism for continuous operation in connection with the operating mechanism.

103. In a cash register, the combination with an operating mechanism, of a series of movable counter carrying frames, a movable throwing device mounted on each frame, and a series of cams—one for each of said throwing devices, said cams being constructed to engage their respective throwing devices to either operate the frame or lock it in its retracted position.

104. In a cash register, the combination with a driving mechanism, of a driven member arranged to be oscillated thereby, means for limiting the oscillation of the driven member, an indicator, and means for operating the indicator arranged to be disconneted from the driven member during its movement in one direction and connected thereto during its movement in the opposite direction.

105. In a cash register, the combination with a driving mechanism, of a driven member arranged to be oscillated thereby, means for limiting the oscillation of the driven member, an indicator, indicator operating mechanism, means for connecting the indicator operating mechanism to the driven member, and devices for returning the indicator operating mechanism to normal position when disconnected from the driven member.

106. In a cash register, the combination with an operating mechanism, of an indicator, means for connecting the indicator with the operating mechanism for setting the indicator, means for disconnecting the indicator from the operating mechanism, and a positively driven means for returning the indicator to its normal position when so disconnected.

107. In a cash register, the combination with registering devices, of operating gears for same, indicators, sliding rack bars for operating same, geared devices connected to said rack bars, and means for moving said geared devices into and out of mesh with said operating gears at each operation of the machine.

108. In a cash register, the combination with registering mechanism, of gearing for operating same, indicating mechanism, rack bars for operating said indicating mechanism, geared devices for moving said rack bars, a pivoted frame carrying said geared devices, and means for oscillating said frame to carry said geared devices into and out of mesh with said operating gearing.

109. In a cash register, the combination with registering mechanism, of operating gears for same, indicating mechanism, rack bars for operating same, geared devices for operating said rack bars, a pivoted frame carrying said geared devices, and means for rocking said frame to carry said geared devices into mesh with said operating gears and leaving them in mesh until the beginning of a new operation of the machine.

110. In a cash register, the combination with registering mechanism, of operating gears for same, indicating mechanism, operating racks for said indicating mechanism, geared devices controlling said racks normally meshing said operating gears, and means operated in the operation of the machine to withdraw said geared devices from said operating gears to allow a return to normal position of said indicating mechanism, and for restoring said geared devices to mesh and for then giving said operating gears their differential movement.

111. In a registering mechanism, the combination with a registering device, actuating racks for same, and keys controlling said racks; of transfer pawls normally advanced over said registering device, transfer cams for controlling the retracting movement of said transfer pawls, cams for restoring said pawls to normal advanced position successively and thereby operating said transfer, and an element positioned to be engaged by said transfer pawls for preventing overthrow of the adding wheels.

112. In a registering mechanism, the combination with a registering device, actuating mechanism for said device and manipulative devices controlling said actuating mechanism; of transfer actuators normally held in advanced position over said registering device, transfer cams on said registering device controlling the movement of retraction of said transfer actuators means for successively restoring said actuators to advanced position and thereby actuating said registering device, and a flange positioned to be engaged by said transfer actuators at the end of their advance stroke for preventing overthrow of the adding wheels.

113. In a cash register, the combination with a plurality of keys, of a detent for same, means for retaining said detent in position to lock said keys, a release key, means operated by said key for releasing any depressed key, and a locking device for the machine operated by said release key.

114. In a cash register, the combination with banks of keys, of detents for same, means for retaining said detents in position to lock any depressed key, a bar for releasing said retaining means, a key for moving said bar, and a locking device for the machine moved to locking position while the last named key is out of normal position.

115. In a cash register, the combination with operating mechanism, of printing devices controlled thereby, a paper feeding device, means for operating said paper feeding and printing devices, a special key for connecting said means to the operating mechanism for one operation and additional means for making such connections.

116. In a cash register, the combination with printing mechanism, of means for feeding a record material thereto; an operating mechanism for the machine, a key for connecting said operating mechanism and record feed for one operation only of said operating mechanism, and a manipulative device connecting said operating mechanism and record feed until said device is manually moved to break said connection.

In testimony whereof I affix my signature, in the presence of two witnesses.

THOMAS CARNEY.

Witnesses:
 ALVAN MACAULEY,
 IRA BERKSTRESSER